US012761669B2

(12) United States Patent
Bry et al.

(10) Patent No.: US 12,761,669 B2
(45) Date of Patent: Oct. 13, 2026

(54) MULTI-PHASE SEMANTIC THREE-DIMENSIONAL SCAN FOR STRUCTURE INSPECTION

(71) Applicant: Skydio, Inc., San Mateo, CA (US)

(72) Inventors: Adam Parker Bry, Redwood City, CA (US); Hayk Martirosyan, San Francisco, CA (US); Vincent Lecrubier, Lisbon (PT)

(73) Assignee: Skydio, Inc., San Mateo, CA (US)

( * ) Notice: Subject to any disclaimer, the term of this patent is extended or adjusted under 35 U.S.C. 154(b) by 7 days.

(21) Appl. No.: 18/892,300

(22) Filed: Sep. 20, 2024

(65) Prior Publication Data

US 2025/0093882 A1 Mar. 20, 2025

Related U.S. Application Data

(60) Provisional application No. 63/539,357, filed on Sep. 20, 2023.

(51) Int. Cl.
*G05D 1/646* (2024.01)
*G05D 1/689* (2024.01)
(Continued)

(52) U.S. Cl.
CPC ............ *G05D 1/646* (2024.01); *G05D 1/689* (2024.01); *G06T 7/0004* (2013.01); *G06T 7/10* (2017.01);
(Continued)

(58) Field of Classification Search
CPC .... G05D 1/2465; G05D 1/2467; G05D 1/646; G05D 1/689; G05D 2105/89;
(Continued)

(56) References Cited

U.S. PATENT DOCUMENTS

| | | | |
|---|---|---|---|
| 9,245,170 | B1 | 1/2016 | Nikic et al. |
| 10,372,986 | B2 | 8/2019 | Barikmo et al. |

(Continued)

FOREIGN PATENT DOCUMENTS

| | | | | |
|---|---|---|---|---|
| CA | 3147611 C | * | 2/2024 | ............... G05D 1/46 |
| CN | 116189013 A | * | 5/2023 | ............ G06V 20/17 |

(Continued)

OTHER PUBLICATIONS

Cazzato et al., "A Survey of Computer Vision Methods for 2D Object Detection from Unmanned Aerial Vehicles", Journal of Imaging, vol. 6, No. 78, Aug. 4, 2020, pp. 38.

(Continued)

*Primary Examiner* — Babar Sarwar
(74) *Attorney, Agent, or Firm* — Young Basile Hanlon & MacFarlane, P.C.

(57) ABSTRACT

Semantic three-dimensional scan is performed for the multi-phase inspection of a structure using an unmanned aerial vehicle (UAV). The multi-phase inspection includes a first inspection phase and a second inspection phase. A UAV performs the first inspection phase of the structure to determine a semantic understanding of components associated with the structure and pose information of the components. Based on the semantic understanding of the components and the pose information, a flight path indicating capture points and camera poses associated with the capture points is determined. The UAV then performs the second inspection phase of the structure according to the flight path, in which all or some of the components are inspected.

20 Claims, 12 Drawing Sheets

(51) Int. Cl.

| | |
|---|---|
| ***G05D 105/80*** | (2024.01) |
| ***G05D 109/20*** | (2024.01) |
| ***G05D 111/10*** | (2024.01) |
| ***G06T 7/00*** | (2017.01) |
| ***G06T 7/10*** | (2017.01) |
| ***G06T 7/70*** | (2017.01) |
| ***G06V 10/26*** | (2022.01) |
| ***G06V 20/17*** | (2022.01) |

(52) U.S. Cl.
CPC ................ *G06T 7/70* (2017.01); *G06V 10/26* (2022.01); *G06V 20/17* (2022.01); *G05D 2105/89* (2024.01); *G05D 2109/20* (2024.01); *G05D 2111/10* (2024.01); *G06T 2207/10032* (2013.01); *G06T 2207/20112* (2013.01); *G06T 2207/30242* (2013.01); *G06T 2207/30244* (2013.01)

(58) Field of Classification Search
CPC ........... G05D 2107/75; G05D 2109/20; G05D 2109/254; G05D 2111/10; G06T 2207/10032; G06T 2207/20112; G06T 2207/30242; G06T 2207/30244; G06T 7/0004; G06T 7/10; G06T 7/70; G06V 10/26; G06V 20/17; G06V 20/176
See application file for complete search history.

(56) References Cited

U.S. PATENT DOCUMENTS

| | | | | |
|---|---|---|---|---|
| 10,397,802 | B2 | 8/2019 | Priest | |
| 10,650,285 | B1 | 5/2020 | Okazaki | |
| 10,769,844 | B1 * | 9/2020 | Rezvani | G06T 17/05 |
| 10,871,774 | B1 | 12/2020 | Stein | |
| 12,159,387 | B2 * | 12/2024 | Matsumoto | G06T 7/0004 |
| 12,462,557 | B2 | 11/2025 | Ledner et al. | |
| 12,518,366 | B2 * | 1/2026 | Hajjar | G01S 7/4808 |
| 2011/0202845 | A1 | 8/2011 | Mountjoy | |
| 2013/0051658 | A1 | 2/2013 | Hwang et al. | |
| 2013/0147911 | A1 * | 6/2013 | Karsch | H04N 13/261 348/43 |
| 2015/0170526 | A1 | 6/2015 | Wang et al. | |
| 2017/0192424 | A1 | 7/2017 | Poole et al. | |
| 2017/0193829 | A1 * | 7/2017 | Bauer | G06T 17/05 |
| 2018/0002010 | A1 * | 1/2018 | Bauer | B64C 29/0025 |
| 2018/0003161 | A1 * | 1/2018 | Michini | G06T 7/0004 |
| 2018/0032088 | A1 | 2/2018 | Van Cruyningen | |
| 2018/0053054 | A1 * | 2/2018 | Schultz | G01S 19/39 |
| 2018/0095478 | A1 | 4/2018 | Van Cruyningen | |
| 2018/0158197 | A1 * | 6/2018 | Dasgupta | G06V 20/13 |
| 2018/0253862 | A1 * | 9/2018 | Barnes | H04N 23/661 |
| 2019/0050000 | A1 | 2/2019 | Kennedy et al. | |
| 2019/0108384 | A1 * | 4/2019 | Wang | G08G 1/0129 |
| 2019/0204123 | A1 | 7/2019 | Zhao et al. | |
| 2019/0248487 | A1 | 8/2019 | Holtz et al. | |
| 2020/0082629 | A1 | 3/2020 | Jones et al. | |
| 2020/0159252 | A1 * | 5/2020 | Giuffrida | G01C 15/00 |
| 2020/0241574 | A1 * | 7/2020 | Lin | G05D 1/0088 |
| 2021/0035304 | A1 | 2/2021 | Jie | |
| 2021/0049782 | A1 | 2/2021 | Zhai et al. | |
| 2021/0049918 | A1 | 2/2021 | Loveland et al. | |
| 2021/0125406 | A1 | 4/2021 | Henry et al. | |
| 2021/0133997 | A1 * | 5/2021 | Abeywardena | G06V 10/7753 |
| 2021/0241109 | A1 | 8/2021 | Jie | |
| 2021/0263515 | A1 | 8/2021 | Henry et al. | |
| 2021/0343160 | A1 | 11/2021 | Venkataramana et al. | |
| 2022/0092856 | A1 * | 3/2022 | Wu | G06V 10/44 |
| 2022/0180548 | A1 * | 6/2022 | Li | G06V 10/766 |
| 2022/0198793 | A1 * | 6/2022 | Huang | G06T 7/579 |
| 2022/0383231 | A1 | 12/2022 | Saha et al. | |
| 2022/0390964 | A1 * | 12/2022 | Youmans | G05D 1/0016 |
| 2022/0398806 | A1 | 12/2022 | Arksey et al. | |
| 2023/0080178 | A1 * | 3/2023 | Hajjar | G01S 7/4808 382/106 |
| 2023/0260410 | A1 | 8/2023 | Nakazawa et al. | |
| 2023/0312091 | A1 | 10/2023 | Shoeb et al. | |
| 2023/0315123 | A1 | 10/2023 | Shoeb et al. | |
| 2023/0316739 | A1 | 10/2023 | Shoeb et al. | |
| 2023/0316741 | A1 | 10/2023 | Shoeb et al. | |
| 2024/0020876 | A1 * | 1/2024 | Shoeb | B64C 39/024 |
| 2024/0168493 | A1 | 5/2024 | Shoeb | |
| 2024/0212374 | A1 | 6/2024 | Li et al. | |
| 2024/0378857 | A1 | 11/2024 | Fan et al. | |
| 2024/0404030 | A1 | 12/2024 | Kunkel | |
| 2024/0428696 | A1 | 12/2024 | Shoeb et al. | |
| 2025/0014161 | A1 | 1/2025 | Rakha et al. | |
| 2025/0093882 | A1 | 3/2025 | Bry et al. | |
| 2025/0094936 | A1 | 3/2025 | Bry et al. | |
| 2025/0095156 | A1 | 3/2025 | Bry et al. | |
| 2025/0265730 | A1 | 8/2025 | Shoeb | |
| 2025/0342690 | A1 | 11/2025 | Shoeb | |
| 2026/0050864 | A1 | 2/2026 | Fan et al. | |
| 2026/0057600 | A1 | 2/2026 | Jargstorff et al. | |
| 2026/0120459 | A1 | 4/2026 | Ying et al. | |
| 2026/0141813 | A1 | 5/2026 | Moster et al. | |

FOREIGN PATENT DOCUMENTS

| | | | | |
|---|---|---|---|---|
| KR | 102299725 | B1 * | 9/2021 | G06T 17/20 |
| WO | 2021086886 | A1 | 5/2021 | |
| WO | WO-2021137764 | A1 * | 7/2021 | G06V 20/10 |

OTHER PUBLICATIONS

International Search Report and Written Opinion mailed on Dec. 13, 2024 in corresponding PCT Application Serial No. PCT/US2024/047876.

* cited by examiner

MULTI-PHASE SEMANTIC THREE-DIMENSIONAL SCAN FOR STRUCTURE INSPECTION

CROSS-REFERENCE TO RELATED APPLICATION(S)

This application claims the benefit of U.S. Provisional Application Ser. No. 63/539,357, filed Sep. 20, 2023, the entire disclosure of which is herein incorporated by reference.

TECHNICAL FIELD

This application generally relates to structure inspection using an unmanned aerial vehicle (UAV), and, more specifically, to semantic three-dimensional (3D) scan systems and techniques for a multi-phase structure inspection performed using a UAV.

BACKGROUND

UAVs are often used to capture images from vantage points that would otherwise be difficult for humans to reach. Typically, a UAV is operated by a human using a controller to remotely control the movements and image capture functions of the UAV. In some cases, a UAV may have automated flight and autonomous control features. For example, automated flight features may rely upon various sensor input to guide the movements of the UAV.

SUMMARY

Systems and techniques for, inter alia, multi-phase semantic 3D scan are disclosed.

In some implementations, a method comprises: performing, using an unmanned aerial vehicle, a first phase inspection of a structure to determine a semantic understanding of components associated with the structure and pose information of the components; determining, based on the semantic understanding of the components and the pose information, a flight path indicating capture points and camera poses associated with the capture points; and performing, using the unmanned aerial vehicle, a second phase inspection of a subset of the components according to the flight path.

In some implementations of the method, performing the first phase inspection of the structure to determine the semantic understanding of the components and the pose information comprises: navigating the unmanned aerial vehicle to a distance from the structure such that all of the structure is within a field of view of a camera of the unmanned aerial vehicle.

In some implementations of the method, performing the first phase inspection of the structure to determine the semantic understanding of the components and the pose information comprises: detecting the components using a camera of the unmanned aerial vehicle; and storing data indicative of the detected components on two-dimensional images associated with associated poses of the camera.

In some implementations of the method, detecting the components comprises: triangulating, using the unmanned aerial vehicle, locations of the components.

In some implementations of the method, determining the flight path indicating the capture points and the camera poses comprises: determining a number of columns for the unmanned aerial vehicle to vertically navigate, wherein each column of the number of columns includes one or more of the capture points.

In some implementations of the method, the number of columns is four columns, the four columns form a rectangular boundary surrounding the structure, and performing the second phase inspection of the subset of the components according to the flight path comprises: navigating the unmanned aerial vehicle about the rectangular boundary including ascending to a traversal height while moving between ones of the four columns.

In some implementations of the method, the number of columns is two columns, the two columns are at diagonally opposing locations about the structure, and performing the second phase inspection of the subset of the components according to the flight path comprises: navigating the unmanned aerial vehicle between the two columns over the structure.

In some implementations of the method, performing the second phase inspection of the subset of the components according to the flight path comprises: while the unmanned aerial vehicle is at a capture point of the capture points, aiming a camera of the unmanned aerial vehicle at a component of the components according to a camera pose of the camera poses; and capturing, using the aimed camera, an image of the component.

In some implementations of the method, aiming the camera at the component according to the camera pose comprises: continuously attempting to detect the component within a video feed captured using the camera until the component is centered in images of the video feed.

In some implementations of the method, the method comprises: labeling the image with information associated with one or both of the structure or the flight path.

In some implementations of the method, the method comprises: obtaining user input corresponding to one or more of an object of interest, a traversal height, a flight distance, a maximum speed, an exploration radius, a gimbal angle, or a column path, wherein the user input is used to perform the first phase inspection.

In some implementations, a UAV comprises: one or more cameras; one or more memories; and one or more processors configured to execute instructions stored in the one or more memories to: perform a first phase inspection of a structure to determine, based on one or more images captured using the one or more cameras, a semantic understanding of components associated with the structure and pose information of the components; and perform a second phase inspection of a subset of the components according to a flight path that is based on the components and the pose information.

In some implementations of the UAV, to perform the first phase inspection of the structure to determine the semantic understanding of the components and the pose information, the one or more processors are configured to execute the instructions to: capture the one or more images while all of the structure remains within a field of view of the one or more cameras; and perform image segmentation to detect the components within the one or more images.

In some implementations of the UAV, to detect the components within the one or more images, the one or more processors are configured to execute the instructions to: triangulate locations of the components to determine unique locations in three-dimensional space of the components.

In some implementations of the UAV, to perform the second phase inspection of the subset of the components according to the flight path, the one or more processors are configured to execute the instructions to: aim the one or more cameras at a component; and capture, using the aimed one or more cameras, an image of the component.

In some implementations of the UAV, the one or more processors are configured to execute the instructions to: determine the flight path based on the components and the pose information, wherein the flight path indicates capture points and camera poses associated with the capture points, and wherein the capture points are arranged into a number of columns for the unmanned aerial vehicle to vertically navigate.

In some implementations, a system comprises: an unmanned aerial vehicle; and a user device in communication with the unmanned aerial vehicle, wherein the unmanned aerial vehicle is configured to: perform a first phase inspection of a structure according to user input obtained from the user device to determine a semantic understanding of components associated with the structure and pose information of the components; determine, based on the semantic understanding of the components and the pose information, a flight path indicating a number of columns for the unmanned aerial vehicle to vertically navigate, wherein each column of the number of columns includes one or more capture points each associated with one or more of the components; and perform a second phase inspection according to the flight path.

In some implementations of the system, the first phase inspection is performed while all of the structure is within a field of view of a camera of the unmanned aerial vehicle and the components are determined based on images captured using the camera.

In some implementations of the system, the camera is aimed at a component of the one or more of the components according to a camera pose associated with a respective capture point of the one or more capture points to capture an image of the component during the second phase inspection.

In some implementations of the system, where the number of columns is four columns, the four columns form a rectangular boundary surrounding the structure and the unmanned aerial vehicle navigates about the rectangular boundary including ascending to a traversal height while moving between ones of the four columns, and where the number of columns is two columns, the two columns are at diagonally opposing locations about the structure and the unmanned aerial vehicle navigates between the two columns over the structure.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
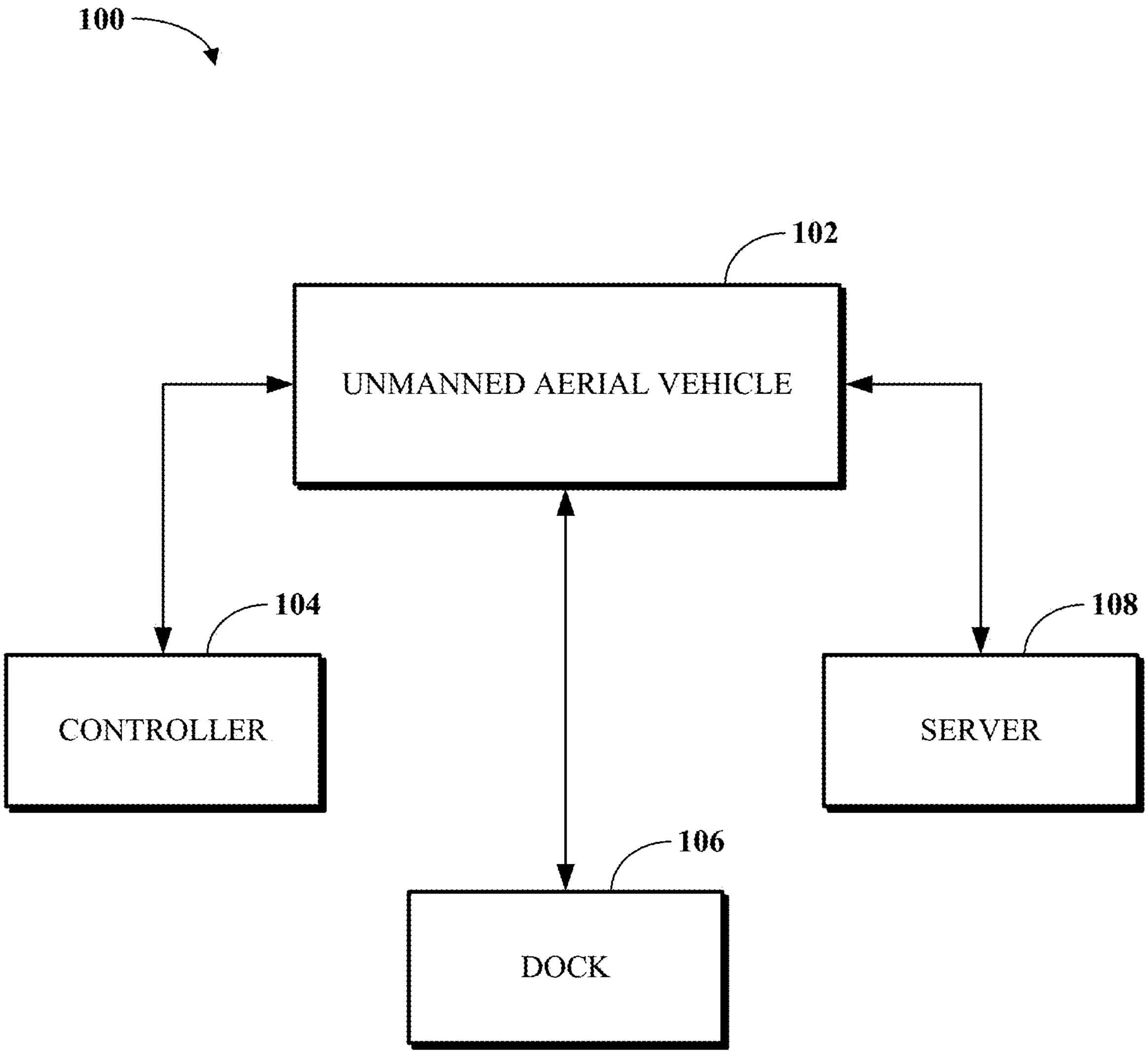
FIG. 1 is an illustration of an example of a UAV system.

The versatility of unmanned aerial vehicles (UAVs) has made their use in structural inspection increasingly common in recent years. Personnel of various industries operate UAVs to navigate about structures (e.g., buildings, towers, bridges, pipelines, and utility equipment) and capture visual media indicative of the statuses and conditions thereof. Initially, UAV inspection processes involved the manual-only operation of a UAV, such as via a user device wirelessly communicating with the UAV; however, automated approaches have been more recently used in which a UAV determines a target structure and performs a sophisticated navigation and media capture process to automatically fly around the structure and capture images and/or video thereof. In some such cases, these automated approaches may involve the UAV or a computing device in communication therewith performing a three-dimensional (3D) scan of a target structure to generate a high-fidelity 3D geometric reconstruction thereof as part of an inspection process. For example, modeling of the 3D geometric reconstruction may be provided to a UAV operator to enable the UAV operator to identify opportunities for a further inspection of the structure.

However, these 3D scan approaches, although representing meaningful improvements over more manual and semi-manual inspection processes, may not be suitable in all structure inspection situations. In particular, such approaches generally involve high-fidelity processing and thus use large amounts of input media generate the 3D geometric reconstruction. This ultimately involves the capture of large amounts of images or videos over a relatively long period of time. Moreover, the 3D geometric reconstruction is purely geometric in that the reconstruction resulting from the 3D scan approach is limited to geometries of the structure. In some situations, however, a UAV operator may not need high-fidelity data about all of a structure, but may instead want to focus on details related or otherwise limited to certain components of the structure. Similarly, the UAV operator may want to have a semantic understanding of the structure that goes beyond what geometries can convey. Finally, while a UAV may of course be manually operated to focus only on certain aspects of a structure, such manual operation is often labor intensive, solve, imprecise, and non-deterministic and thus offers limited value.

Implementations of this disclosure address problems such as these using multi-phase semantic 3D scan approaches for structure inspection. In particular, multi-phase semantic 3D scan according to the implementations of this disclosure includes a two-phase inspection process in which, during a first phase inspection, a UAV determines a semantic understanding of components associated with a structure under inspection and pose information of the components and, during a second phase inspection, the UAV navigates according to a flight path determined based on the components and pose information to capture images of a subset of the components of the structure. The first phase inspection may be referred to generally as an exploration phase in which structure components of relevance are identified within the inspection scene. The second phase inspection may be referred to generally as an inspection phase in which a detailed inspection limited to those components of relevance is performed. The multi-phase semantic 3D scan approaches disclosed herein involve the unique identification, by type and location, of structure components using triangulation and camera pose information obtained via the first phase inspection. Thus, using the implementations of this disclosure, portions of a structure may be inspected in a time- and media-sensitive manner and in detail beyond what is conveyable by structure geometry.

Generally, the quality of a scan (i.e., an inspection or an operation of an inspection) being "semantic" refers to the scan incorporating information and processing to recognize detailed contextual information for a structure and components thereof. In particular, a UAV performing a semantic 3D scan for a structure inspection may access and leverage comprehensive taxonomies of structures and components, generated empirically and/or via machine learning-based classification and recognition processes modeled across data sets. Using this taxonomical information, the UAV readily identifies components of relevance to a given inspection from amongst a generally or near exhaustive listing of components scanned via the first phase inspection. This semantic understanding of structures and components enables valuable automations for UAV-based structure inspections, improving the accuracy of captured data and materially reducing time and media capture requirements of other scan approaches. For example, a semantic understanding of a structure component may indicate one or more camera poses for a UAV to automatically assume to perform an inspection of (i.e., capture images of) the component, such as based on known angles and views which are desirable for the component.

To describe some implementations in greater detail, reference is first made to examples of hardware and software structures used to implement a semantic 3D scan system. FIG. 1 is an illustration of an example of a UAV system 100. The system 100 includes a UAV 102, a controller 104, a dock 106, and a server 108.

The UAV 102 is a vehicle which may be controlled autonomously by one or more onboard processing aspects or remotely controlled by an operator, for example, using the controller 104. The UAV 102 may be implemented as one of a number of types of unmanned vehicle configured for aerial operation. For example, the UAV 102 may be a vehicle commonly referred to as a drone but may otherwise be an aircraft configured for flight within a human operator present therein. In particular, the UAV 102 may be a multi-rotor vehicle. For example, the UAV 102 may be lifted and propelled by four fixed-pitch rotors in which positional adjustments in-flight may be achieved by varying the angular velocity of each of those rotors.

The controller 104 is a device configured to control at least some operations associated with the UAV 102. The controller 104 may communicate with the UAV 102 via a wireless communications link (e.g., via a Wi-Fi network, a Bluetooth link, a ZigBee link, or another network or link) to receive video or images and/or to issue commands (e.g., take off, land, follow, manual controls, and/or commands related to conducting an autonomous or semi-autonomous navigation of the UAV 102). The controller 104 may be or include a specialized device. Alternatively, the controller 104 may be or includes a mobile device, for example, a smartphone, tablet, laptop, or other device capable of running software configured to communicate with and at least partially control the UAV 102.

The dock 106 is a structure which may be used for takeoff and/or landing operations of the UAV 102. In particular, the dock 106 may include one or more fiducials usable by the UAV 102 for autonomous takeoff and landing operations. For example, the fiducials may generally include markings which may be detected using one or more sensors of the UAV 102 to guide the UAV 102 from or to a specific position on or in the dock 106. In some implementations, the dock 106 may further include components for charging a battery of the UAV 102 while the UAV 102 is on or in the dock 106. The dock 106 may be a protective enclosure from which the UAV 102 is launched. A location of the dock 106 may correspond to the launch point of the UAV 102.

The server 108 is a remote computing device from which information usable for operation of the UAV 102 may be received and/or to which information obtained at the UAV 102 may be transmitted. For example, the server 108 may be used to train a learning model usable by one or more aspects of the UAV 102 to implement functionality of the UAV 102. In another example, signals including information usable for updating aspects of the UAV 102 may be received from the server 108. The server 108 may communicate with the UAV 102 over a network, for example, the Internet, a local area network, a wide area network, or another public or private network.

In some implementations, the system 100 may include one or more additional components not shown in FIG. 1. In some implementations, one or more components shown in FIG. 1 may be omitted from the system 100, for example, the server 108.

Figure 2A:
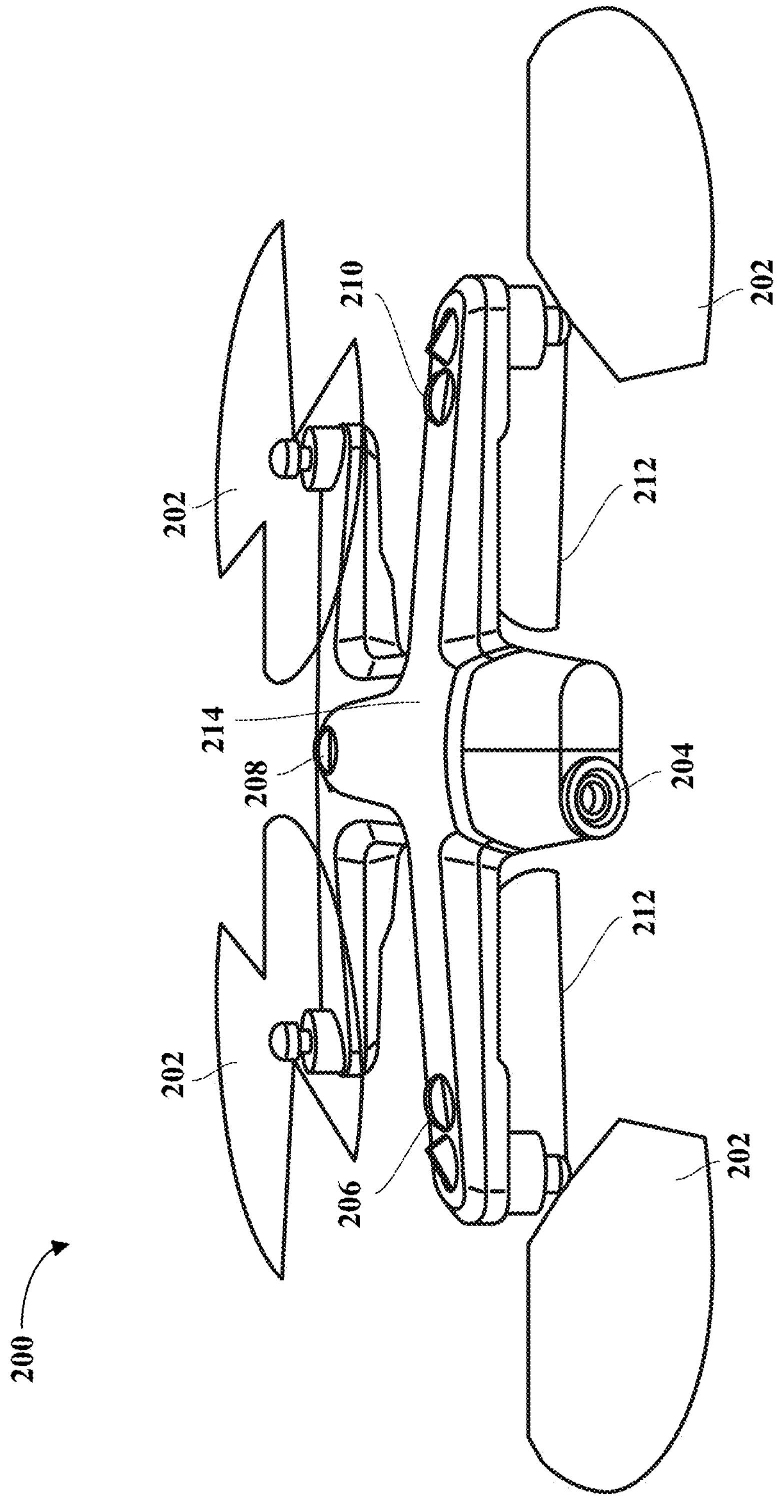
FIG. 2A is an illustration of an example of a UAV as seen from above.
Figure 2B:
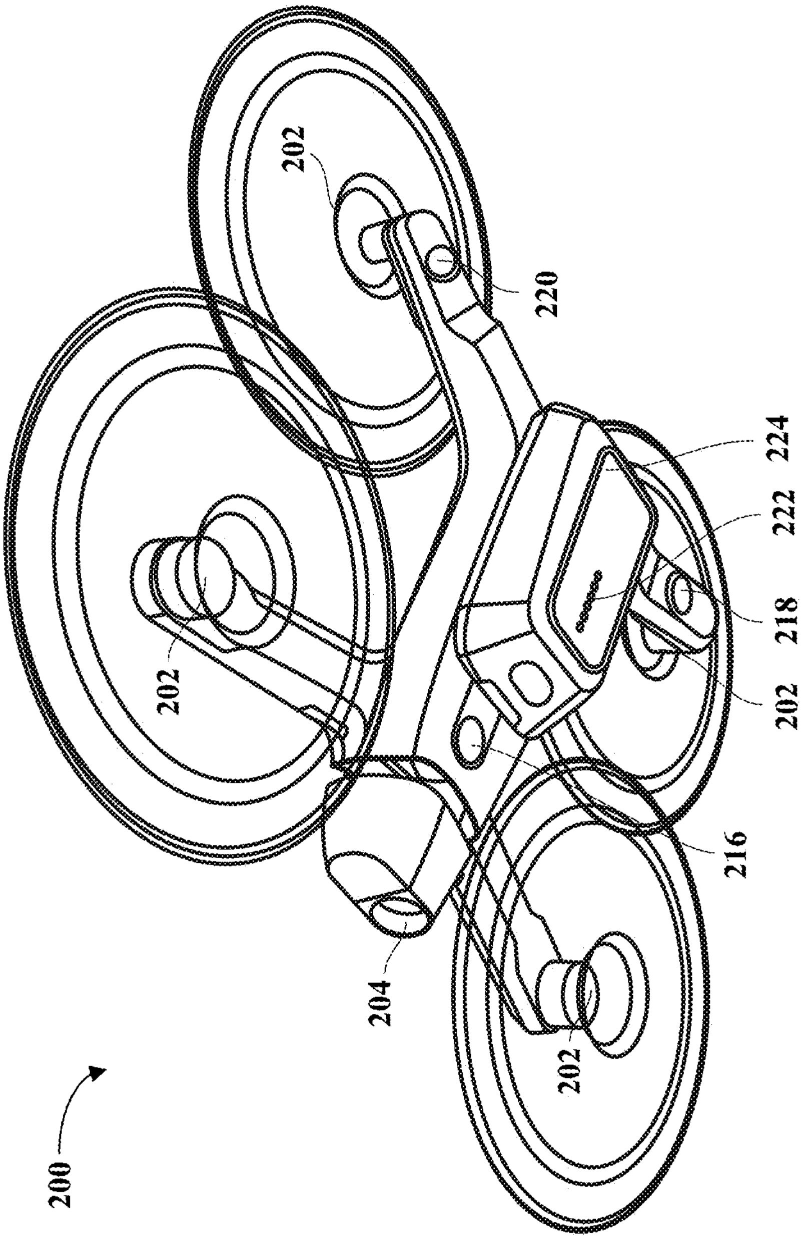
FIG. 2B is an illustration of an example of a UAV as seen from below.

An example illustration of a UAV 200, which may, for example, be the UAV 102 shown in FIG. 1, is shown in FIGS. 2A-B. FIG. 2A is an illustration of an example of the UAV 200 as seen from above. The UAV 200 includes a propulsion mechanism 202 including some number of propellers (e.g., four) and motors configured to spin the propellers. For example, the UAV 200 may be a quad-copter drone. The UAV 200 includes image sensors, including a high-resolution image sensor 204. This image sensor 204 may, for example, be mounted on a gimbal to support steady, low-blur image capture and object tracking. The UAV 200 also includes image sensors 206, 208, and 210 that are spaced out around the top of the UAV 200 and covered by respective fisheye lenses to provide a wide field of view and support stereoscopic computer vision. The image sensors 206, 208, and 210 generally have a resolution which is lower than a resolution of the image sensor 204. Additionally, the UAV 200 includes a number of arms 212 (e.g., four). The propulsion mechanisms 202 may be mounted to the arms 212. The arms 212 are attached the body 214 of the UAV 200. The propulsion mechanisms 202, the arms 212, and the body 214 may collectively be referred to as the frame of the UAV 200. The UAV 200 also includes other internal hardware, for example, a processing apparatus (not shown). In some implementations, the processing apparatus is configured to automatically fold the propellers when entering a dock (e.g., the dock 106 shown FIG. 1), which may allow the dock to have a smaller footprint than the area swept out by the propellers of the propulsion mechanism 202.

FIG. 2B is an illustration of an example of the UAV 200 as seen from below. From this perspective, three more image sensors 216, 218, and 220 arranged on the bottom of the UAV 200 may be seen. These image sensors 216, 218, and 220 may also be covered by respective fisheye lenses to provide a generally wide field of view and support stereoscopic computer vision. The various image sensors of the UAV 200 may enable visual inertial odometry (VIO) for high resolution localization and obstacle detection and avoidance. For example, the image sensors may be used to capture images including infrared data which may be processed for day or night mode navigation of the UAV 200. The UAV 200 also includes a battery in battery pack 224 attached on the bottom of the UAV 200, with conducting contacts 222 to enable battery charging. The bottom surface of the battery pack 224 may be a bottom surface of the UAV 200.

Figure 3:
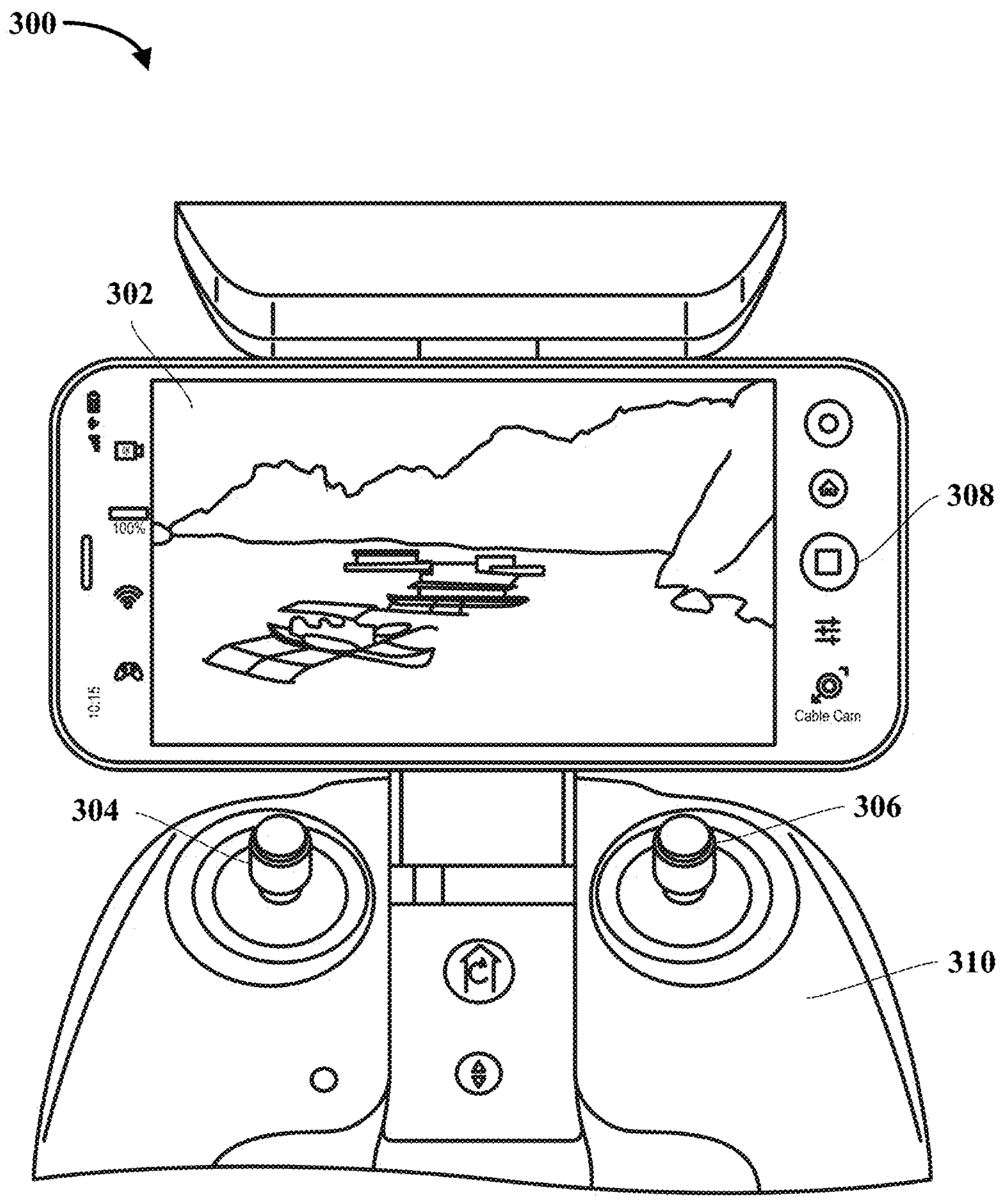
FIG. 3 is an illustration of an example of a controller for a UAV.

FIG. 3 is an illustration of an example of a controller 300 for a UAV, which may, for example, be the UAV 102 shown in FIG. 1. The controller 300 may, for example, be the controller 104 shown in FIG. 1. The controller 300 may provide a user interface for controlling the UAV and reviewing data (e.g., images) received from the UAV. The controller 300 includes a touchscreen 302, a left joystick 304, and a right joystick 306. In the example as shown, the touchscreen 302 is part of a mobile device 308 (e.g., a smartphone) that connects to a controller attachment 310, which, in addition to providing additional control surfaces including the left joystick 304 and the right joystick 306, may provide range extending communication capabilities for longer distance communication with the UAV.

Figure 4:
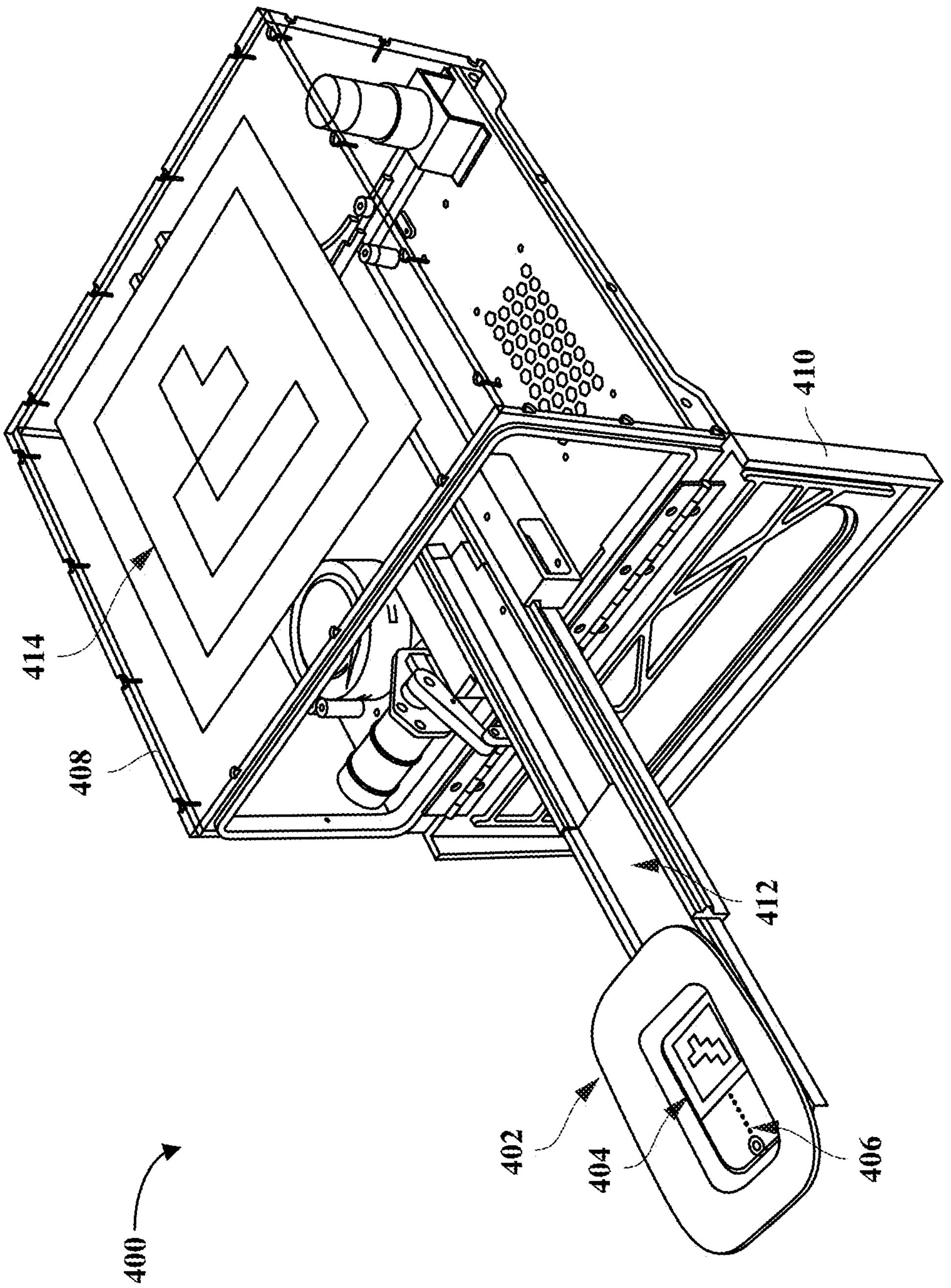
FIG. 4 is an illustration of an example of a dock for facilitating autonomous landing of a UAV.

FIG. 4 is an illustration of an example of a dock 400 for facilitating autonomous landing of a UAV, for example, the UAV 102 shown in FIG. 1. The dock 400 may, for example, be the dock 106 shown in FIG. 1. The dock 400 includes a cradle 402 (i.e., landing surface) with a fiducial 404, charging contacts 406 for a battery charger, a box 408 in the shape of a rectangular box with a door 410, and a retractable arm 412.

The cradle 402 is configured to hold a UAV. The UAV may be configured for autonomous landing on the cradle 402. The cradle 402 has a funnel geometry shaped to fit a bottom surface of the UAV at a base of the funnel. The tapered sides of the funnel may help to mechanically guide the bottom surface of the UAV into a centered position over the base of the funnel during a landing. For example, corners at the base of the funnel may serve to prevent the aerial vehicle from rotating on the cradle 402 after the bottom surface of the aerial vehicle has settled into the base of the funnel shape of the cradle 402. For example, the fiducial 404 may include an asymmetric pattern that enables robust detection and determination of a pose (i.e., a position and an orientation) of the fiducial 404 relative to the UAV based on an image of the fiducial 404, for example, captured with an image sensor of the UAV.

The conducting contacts 406 are contacts of a battery charger on the cradle 402, positioned at the bottom of the funnel. The dock 400 includes a charger configured to charge a battery of the UAV while the UAV is on the cradle 402. For example, a battery pack of the UAV (e.g., the battery pack 224 shown in FIG. 2B) may be shaped to fit on the cradle 402 at the bottom of the funnel shape. As the UAV makes its final approach to the cradle 402, the bottom of the battery pack will contact the cradle 402 and be mechanically guided by the tapered sides of the funnel to a centered location at the bottom of the funnel. When the landing is complete, the conducting contacts of the battery pack may come into contact with the conducting contacts 406 on the cradle 402, making electrical connections to enable charging of the battery of the UAV. The dock 400 may include a charger configured to charge the battery while the UAV is on the cradle 402.

The box 408 is configured to enclose the cradle 402 in a first arrangement and expose the cradle 402 in a second arrangement. The dock 400 may be configured to transition from the first arrangement to the second arrangement automatically by performing steps including opening the door 410 of the box 408 and extending the retractable arm 412 to move the cradle 402 from inside the box 408 to outside of the box 408.

The cradle 402 is positioned at an end of the retractable arm 412. When the retractable arm 412 is extended, the cradle 402 is positioned away from the box 408 of the dock 400, which may reduce or prevent propeller wash from the propellers of a UAV during a landing, thus simplifying the landing operation. The retractable arm 412 may include aerodynamic cowling for redirecting propeller wash to further mitigate the problems of propeller wash during landing. The retractable arm supports the cradle 402 and enables the cradle 402 to be positioned outside the box 408, to facilitate takeoff and landing of a UAV, or inside the box 408, for storage and/or servicing of a UAV.

In some implementations, the dock 400 includes a fiducial 414 on an outer surface of the box 408. The fiducial 404 and the fiducial 414 may be detected and used for visual localization of the UAV in relation the dock 400 to enable a precise landing on the cradle 402. For example, the fiducial 414 may encode data that, when processed, identifies the dock 400, and the fiducial 404 may encode data that, when processed, enables robust detection and determination of a pose (i.e., a position and an orientation) of the fiducial 414 relative to the UAV. The fiducial 414 may be referred to as a first fiducial and the fiducial 404 may be referred to as a second fiducial. The first fiducial may be larger than the second fiducial to facilitate visual localization from farther distances as a UAV approaches the dock 400. For example, the area of the first fiducial may be 25 times the area of the second fiducial.

The dock 400 is shown by example only and is non-limiting as to form and functionality. Thus, other implementations of the dock 400 are possible. For example, other implementations of the dock 400 may be similar or identical to the examples shown and described within U.S. patent application Ser. No. 17/889,991, filed Aug. 31, 2022, the entire disclosure of which is herein incorporated by reference.

Figure 5:
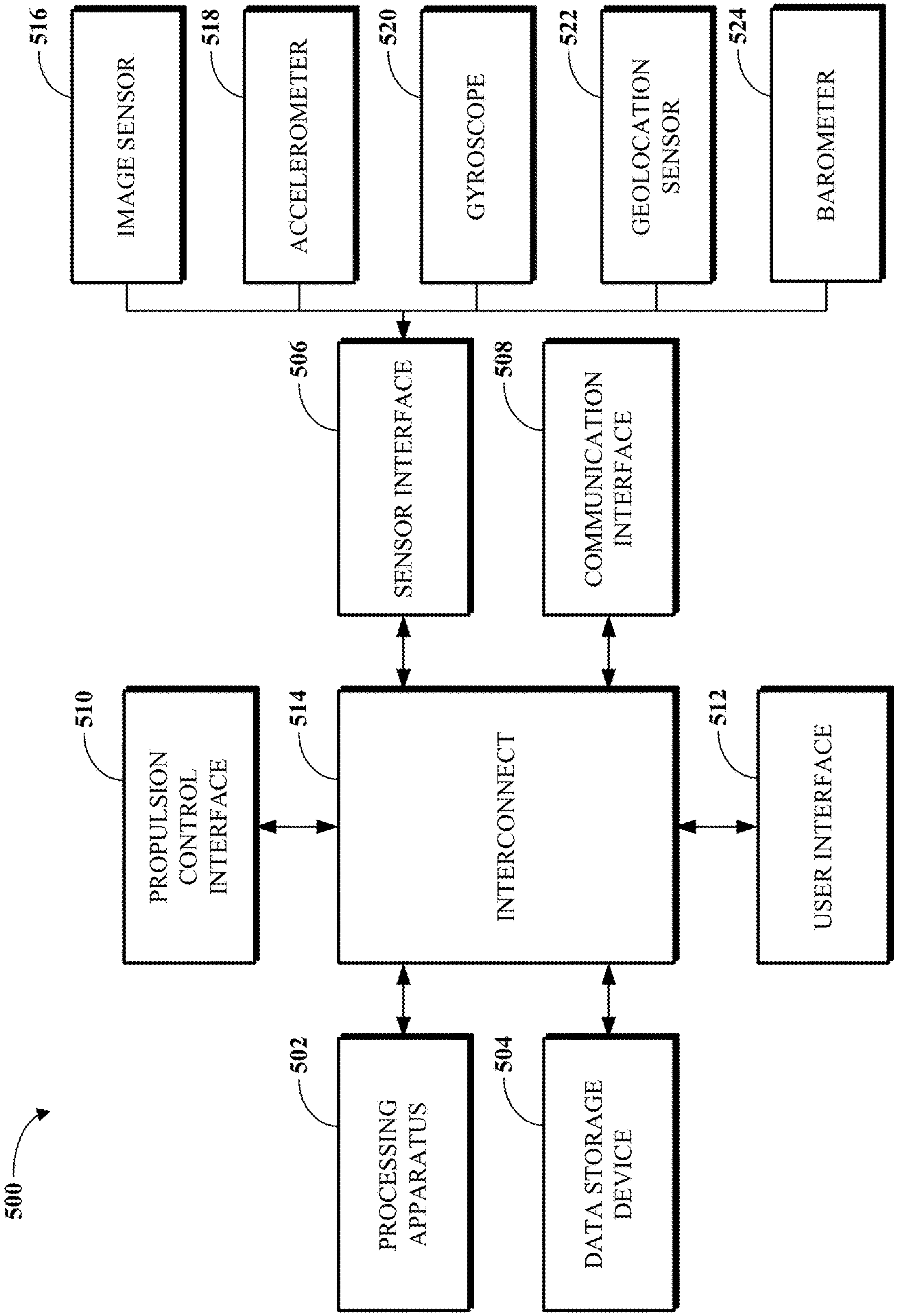
FIG. 5 is a block diagram of an example of a hardware configuration of a UAV.

FIG. 5 is a block diagram of an example of a hardware configuration of a UAV 500, which may, for example, be the UAV 102 shown in FIG. 1. The UAV 500 includes a processing apparatus 502, a data storage device 504, a sensor interface 506, a communications interface 508, propulsion control interface 510, a user interface 512, and an interconnect 514 through which the processing apparatus 502 may access the other components.

The processing apparatus 502 is operable to execute instructions that have been stored in the data storage device 504 or elsewhere. The processing apparatus 502 is a processor with random access memory (RAM) for temporarily storing instructions read from the data storage device 504 or elsewhere while the instructions are being executed. The processing apparatus 502 may include a single processor or multiple processors each having single or multiple processing cores. Alternatively, the processing apparatus 502 may include another type of device, or multiple devices, capable of manipulating or processing data. The processing apparatus 502 may be arranged into processing unit, such as a central processing unit (CPU) or a graphics processing unit (GPU).

The data storage device 504 is a non-volatile information storage device, for example, a solid-state drive, a read-only memory device (ROM), an optical disc, a magnetic disc, or another suitable type of storage device such as a non-transitory computer readable memory. The data storage device 504 may include another type of device, or multiple devices, capable of storing data for retrieval or processing by the processing apparatus 502. The processing apparatus 502 may access and manipulate data stored in the data storage device 504 via the interconnect 514, which may, for example, be a bus or a wired or wireless network (e.g., a vehicle area network).

The sensor interface 506 is configured to control and/or receive data from one or more sensors of the UAV 500. The data may refer, for example, to one or more of temperature measurements, pressure measurements, a global positioning system (GPS) data, acceleration measurements, angular rate measurements, magnetic flux measurements, a visible spectrum image, an infrared image, an image including infrared data and visible spectrum data, and/or other sensor output. For example, the one or more sensors from which the data is generated may include single or multiple of one or more of an image sensor 516, an accelerometer 518, a gyroscope 520, a geolocation sensor 522, a barometer 524, and/or another sensor. In some implementations, the accelerometer 518 and the gyroscope 520 may be combined as an inertial measurement unit (IMU). In some implementations, the sensor interface 506 may implement a serial port protocol (e.g., inter-integrated circuit (I2C) or serial peripheral interface (SPI)) for communications with one or more sensor devices over conductors. In some implementations, the sensor interface 506 may include a wireless interface for communicating with one or more sensor groups via low-power, short-range communications techniques (e.g., using a vehicle area network protocol).

The communications interface 508 facilitates communication with one or more other devices, for example, a paired dock (e.g., the dock 106), a controller (e.g., the controller 104), or another device, for example, a user computing device (e.g., a smartphone, tablet, or other device). The communications interface 508 may include a wireless interface and/or a wired interface. For example, the wireless interface may facilitate communication via a Wi-Fi network, a Bluetooth link, a ZigBee link, or another network or link. In another example, the wired interface may facilitate communication via a serial port (e.g., RS-232 or universal serial bus (USB)). The communications interface 508 further facilitates communication via a network, which may, for example, be the Internet, a local area network, a wide area network, or another public or private network.

The propulsion control interface 510 is used by the processing apparatus to control a propulsion system of the UAV 500 (e.g., including one or more propellers driven by electric motors). For example, the propulsion control interface 510 may include circuitry for converting digital control signals from the processing apparatus 502 to analog control signals for actuators (e.g., electric motors driving respective propellers). In some implementations, the propulsion control interface 510 may implement a serial port protocol (e.g., I2C or SPI) for communications with the processing apparatus 502. In some implementations, the propulsion control interface 510 may include a wireless interface for communicating with one or more motors via low-power, short-range communications (e.g., a vehicle area network protocol).

The user interface 512 allows input and output of information from/to a user. In some implementations, the user interface 512 can include a display, which can be a liquid crystal display (LCD), a light emitting diode (LED) display (e.g., an organic light-emitting diode (OLED) display), or another suitable display. In some such implementations, the user interface 512 may be or include a touchscreen. In some implementations, the user interface 512 may include one or more buttons. In some implementations, the user interface 512 may include a positional input device, such as a touchpad, touchscreen, or the like, or another suitable human or machine interface device.

In some implementations, the UAV 500 may include one or more additional components not shown in FIG. 5. In some implementations, one or more components shown in FIG. 5 may be omitted from the UAV 500, for example, the user interface 512.

Figure 6:
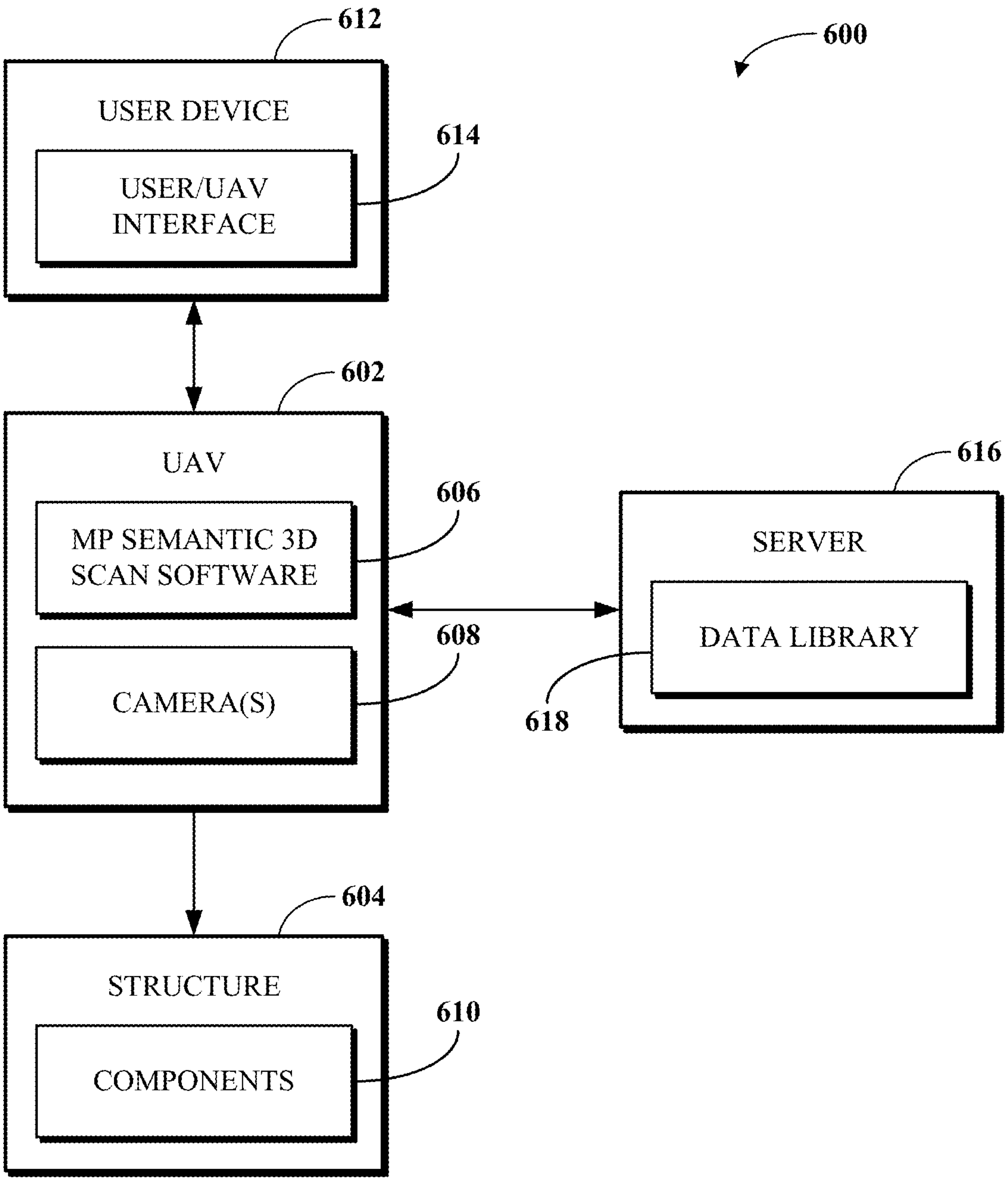
FIG. 6 is a block diagram of an example of a multi-phase semantic 3D scan system.

FIG. 6 is a block diagram of an example of a multi-phase semantic 3D scan system 600. The system 600 includes a UAV 602 and a structure 604 to be inspected using the UAV 602. The UAV 602 may, for example, be the UAV 102 shown in FIG. 1, the UAV 200 shown in FIGS. 2A-B, and/or the UAV 500 shown in FIG. 5. The structure 604 is a physical, 3D structural object that can be wholly or partially flown around by the UAV 602. Non-limiting examples of the structure 604 include buildings (e.g., residential, commercial, or industrial, including internal portions (e.g., warehouse aisles)), bridges (e.g., utility, walkway, or roadway), towers (e.g., powerline transmission, radio, cellular, or water), energy equipment (e.g., sub-stations, wind turbines, solar cells or farms, or power plant cooling towers), vehicles (e.g., aircraft, marine vessels, spacecraft, or land vehicles), civil spaces (e.g., parks or parking lots), and geographic features (e.g., forests, bluffs, mountains, valleys, or ravines). In some cases, the structure 604 may include a living being rather than or in addition to an object as described above. Non-limiting examples of the living being in such a case include humans, animals, fungi, and plants.

The UAV 602 includes hardware and software that configure the UAV 602 to perform a multi-phase semantic 3D scan of the structure 604. In particular, and in addition to other components as are described with respect to FIG. 5, the UAV 602 includes multi-phase semantic 3D scan software 606 and one or more cameras 608. The multi-phase semantic 3D scan software 606, which will be described further in connection with FIG. 7, includes functionality for enabling the UAV 602 to perform a multi-phase inspection of the structure 604 as a semantic 3D scan including a first phase inspection via which the UAV 602, using the one or more cameras 608, captures images used to determine components 610 of the structure 604 and a second phase inspection via which the UAV 602, using the one or more cameras 608, captures images of a subset of the components 610 according to a flight path for the semantic 3D scan.

The components 610 generally are, include, or otherwise refer to components (e.g., objects, elements, pieces, equipment, sub-equipment, tools, or other physical matter) associated with (i.e., on or within) the structure 604. In one non-limiting example, where the structure 604 is a powerline transmission tower, the components 610 may include one or more of an insulator, a static line or connection point, a conductor or overhead wire, a footer, or a transformer). The structure 604 may include any number of types of the components 610 and any number of ones of the components 610 for each of the individual types thereof.

The output of the multi-phase semantic 3D scan inspection of the structure 604 includes at least one or more images, captured using the one or more cameras 608, of a subset of the components 610. The output may be communicated to a user device 612 via a user/UAV interface 614.

The user device 612 is a computing device configured to communicate with the UAV 602 wirelessly or by wire. For example, the user device 612 may be one or more of the controller 104 shown in FIG. 1 or the controller 300 shown in FIG. 3. In some cases, the UAV performs the multi-phase semantic 3D scan inspection of the structure 604 using input obtained from the user device 612. For example, the input obtained from the user device 612 may include information specifying one or more of the components 610 to inspect, a height at which the UAV 602 will fly while traversing along a flight path, a distance for the UAV 602 to fly, a maximum speed for the UAV 602 to fly, a radius that the UAV 602 will use to orbit or otherwise explore and evaluate the structure 604, a gimbal angle for the one or more cameras 608, a column path for the flight path, an instruction for data capture at waypoints of the flight path, or an instruction for stopping the inspection of the structure 604.

The UAV 602, via the multi-phase semantic 3D scan software 606, may utilize empirical and/or machine learning-based data modeled for use in structure inspections. In particular, the UAV 602 may communicate with a server 616 that includes a data library 618 usable by the multi-phase semantic 3D scan software 606 to perform a multi-phase semantic 3D scan inspection of the structure 604. The server 616 is a computing device remotely accessible by or otherwise to the UAV 602. The data library 618 may, for example, include one or more of historic inspection data for the structure 604 or like structures, machine learning models (e.g., classification engines comprising trained convolutional or deep neural networks) trained according to inspection image output data sets with user-specific information culled, and/or other information usable by the system 600. In some cases, the data library 618 or other aspects at the server 616 may be accessed by or otherwise using the user device 612 instead of the UAV 602.

Figure 7:
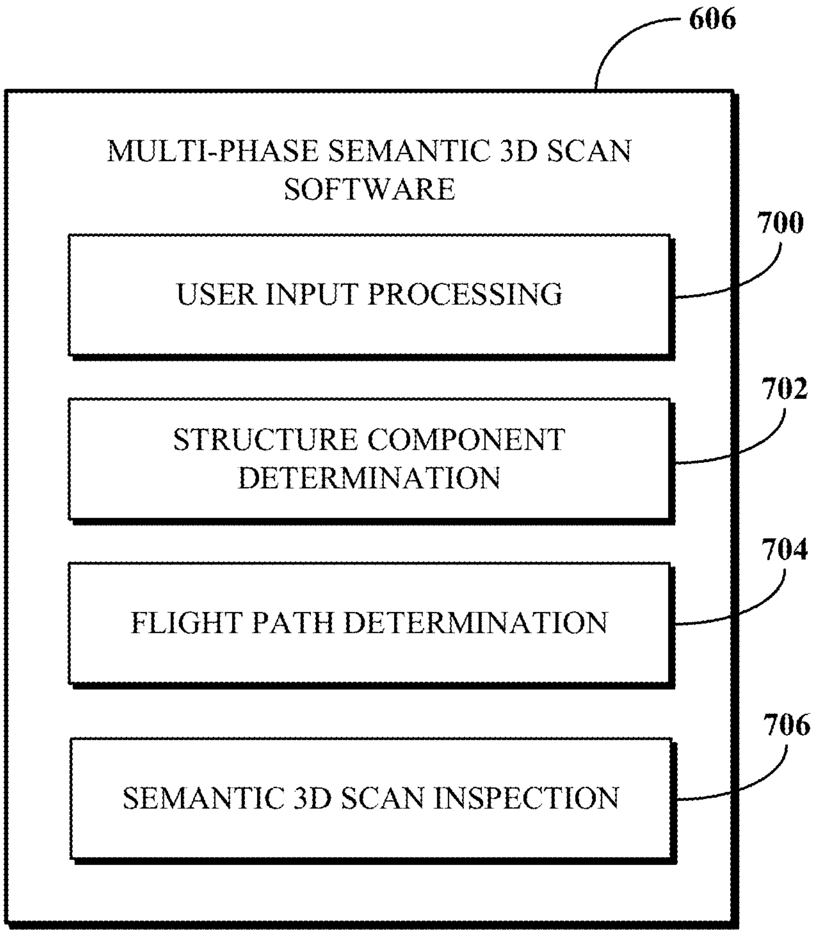
FIG. 7 is a block diagram of example functionality of multi-phase semantic 3D scan software.

To further describe functionality of the multi-phase semantic 3D scan software 606, reference is next made to FIG. 7, which is a block diagram of example functionality of the multi-phase semantic 3D scan software 606. The multi-phase semantic 3D scan software 606, as described above, may use various functionality of a UAV (e.g., the UAV 602 shown in FIG. 6) to cause the UAV to perform a multi-phase semantic 3D scan for the inspection of a structure. The multi-phase semantic 3D scan software 606 includes a user input processing tool 700, a structure component determination tool 702, a flight path determination tool 704, and a semantic 3D scan inspection tool 706. The tools 700 through 706 represent various functionality of the multi-phase semantic 3D scan software 700 and are non-limiting as to a particular structure or other expression of code, script, or the like.

The user input processing tool 700 obtains and processes input obtained from an operator of the UAV for the multi-phase semantic 3D scan of the structure (e.g., the structure 604 shown in FIG. 6). The input includes configuration information for the scan and may be obtained in one or more formats, including free-text, selections from listed options, or the like. For example, the input may include information specifying one or more of objects of interest for the scan (e.g., the components to inspect, such as the components 610 shown in FIG. 6), a height (i.e., altitude) at which the UAV will fly while traversing along a flight path (e.g., between columns of the flight path, as described below), a distance for the UAV to fly from a boundary of the structure, a maximum speed for the UAV to fly (e.g., in miles per hour or kilometers per hour), a radius that the UAV will use to orbit or otherwise explore and evaluate the structure during a first phase inspection of the structure (e.g., in which the radius is larger than the sum of a stand-off distance and half of a dimensional measurement associated with the structure), a gimbal angle for one or more cameras of the UAV (e.g., set for individual objects or universally for all objects, in which the gimbal angle may by default be zero and in which multiple gimbal angles may accordingly be set), a column path for the flight path (e.g., indicating whether to use two or four columns), an instruction for data capture at waypoints of the flight path (e.g., enabling or disabling the automatic image capture at each waypoint of the flight path during autonomous flight), or an instruction for stopping the inspection of the structure (e.g., enabling or disabling the UAV pausing at each waypoint of the flight path during autonomous flight). The user input processing tool 700 processes this input and passes same for use with other tools of the multi-phase semantic 3D scan software 606 to configure the multi-phase inspection of the structure according to the input.

As will be described in more detail below, additional user input may be obtained and processed using the user input processing tool 700 following a first inspection phase of the multi-phase semantic 3D scan of the structure. In particular, in some cases, output of the first inspection phase indicating a semantic understanding of components associated with (i.e., on or within) the structure and pose information of the components may be presented to an operator of the UAV (e.g., via the user device or a secondary device in communication with the user device or otherwise registered for use with the UAV). The output of the first inspection phase in such cases is presented to enable the operator of the UAV to indicate ones of the components which they would like the UAV to inspect during a second inspection phase of the multi-phase semantic 3D scan of the structure. For example, a list of components determined via the first inspection phase may be presented within a graphical user interface (GUI) output for display at the user device or a secondary device. The list may include individual entries each corresponding to a different component type. For example, where the structure is a powerline transmission tower, the GUI may include a first entry for insulators, a second entry for connection points, a third entry for conductors, and so on. The entries may each have a selectable or otherwise interactive element (e.g., a checkbox). When such an interactive element is selected or otherwise interacted, the additional user input is obtained, in which the additional user input indicates an intention of the UAV operator to cause the respective components associated with the subject entry to be inspected during a second phase inspection of the multi-phase semantic 3D scan of the structure. However, selections of components in this manner may instead be performed automatically by the UAV or otherwise by a computing device in communication with the UAV (e.g., using intelligence of detected components independently, relative to the structure, or in view of an inspection purpose for the structure (e.g., known issues resulting in the performance of the multi-phase semantic 3D scan of the structure)). Thus, the additional user input as described herein may be limited to manual processes for indicating components rather than automated approaches for indicating components.

In some cases, the additional user input may be provided partially before and partially after performance of the second-phase inspection. For example, after the second-phase inspection begins, the user input processing tool 700 may receive, via a GUI output for display at the user device or a secondary device, input indicating control values for capturing the one or more images during the second phase inspection. The control values are generally values usable by the UAV and/or the multi-phase semantic 3D scan software 606 to control some aspect of the second phase inspection and may, in non-limiting examples, refer to one or more of gimbal angles for the UAV camera(s), viewpoints of the UAV relative to components to inspect, or incline values indicating how the UAV is to approach the component in one or more directions.

The structure component determination tool 702 determines semantic understandings of components associated with (i.e., on or within) the structure to inspect and pose information of the components. As will be described in more detail below, a first inspection phase of the multi-phase semantic 3D scan of the structure includes the UAV capturing one or more images (i.e., exploration images) of the structure while navigating about an exploration path around some or all of the structure. The structure component determination tool 702 obtains, as input, those one or more images captured during the first inspection phase and processes them to determine, as output, semantic understandings of the components to inspect and the pose information of the components. In particular, the structure component determination tool 702 processes an image captured by the UAV during the first inspection phase to detect one or more objects, as one or more components, within the image and to determine pose information of those one or more components using navigation system information of the UAV.

Detecting the one or more objects within the image as the one or more components includes performing object detection against the image to identify a bounding box for each component within the image. Objects detected within the image are thus represented via their bounding box, and object recognition is performed against the bounded objects to identify them as components of the structure, as well as to identify what components they are. In some cases, performing object recognition includes comparing objects detected within the images against modeled object data to determine whether an object appears as expected. The objects detected and recognized are identified as components and information indicating the components is stored in connection with the bounding boxes of the components. In some cases, image segmentation may be performed instead of object detection and object recognition. In some cases, other computer vision techniques may be performed instead of either of the above approaches.

Determining the pose information of the one or more components detected within the image using the navigation system information of the UAV includes determining orientations and/or locations of the detected components based on their bounding boxes. The pose information of the components thus corresponds to or otherwise represents the orientations and/or locations of the different components within a scene of the structure. In particular, the pose information of a given component may identify sides, facets, surfaces, or like qualities of the component independently and with relation to others. For example, the pose information may identify a front of a component such that a location of the front of the component may be identifiable. In some cases, the pose information of a component may be based on the type of the component. For example, because inspectors of powerline transmission towers generally need to view insulators from their top and bottom sides, the pose information for an insulator component may include a top pose above the insulator and a bottom pose below the insulator.

Because it is important that objects be uniquely identified to prevent multiple of the same component from being confused as being the same exact component, the structure component determination tool 702, as part of the component and pose information determination, performs a triangulation process to ensure that specific component location information is known. In particular, locations of bounding boxes for detected components may be denoted using location data according to one or more of a visual positioning system (VPS) of the UAV, GPS, or another location-based system. The location data for bounding boxes of the detected components may be compared to determine duplicate components, in which a duplicate component is a component that has already been detected in a previous image. Duplicate components are accordingly culled to prevent them from being considered for scanning multiple times.

The flight path determination tool 704 determines a flight path for the UAV to navigate within the scene of the structure based on the components and the pose information of the components, as determined using the structure component determination tool 702. In particular, the flight path includes capture points (e.g., waypoints) to which the UAV will navigate for capturing one or more images of individual components of the components during the second phase inspection of the structure. The capture points are expressed as a sequence within the flight path according to a trajectory determined using the flight path determination tool 704. The capture points are generally arranged into a number of columns, in which a column generally refers to a vertical airspace through which the UAV will ascend, descend, and/or otherwise navigate to capture one or more images of one or more components visible from that column according to the respective pose information. The specific size of a column is non-limiting, however generally a height of a column will exceed a width of the column. The flight path thus causes the UAV to navigate between all columns during the second phase inspection.

Determining the flight path for the UAV to navigate includes determining a trajectory for the UAV to navigate proximate to locations of the bounding boxes determined using the structure component determination tool 702. Determining the trajectory includes determining a number of columns for the UAV to vertically navigate based on the locations of the components according to location information identified for their respective bounding boxes, in which each column of the number of columns includes one or more of the capture points. In particular, a bounding box determined for a component may identify a VPS-based, GPS-based, or other location for the component within the scene of the structure. The location of a bounding box may be recorded within data or metadata associated with the bounding box. Thus, the flight path determination tool 704 obtains the location information for each of the bounding boxes (i.e., for each of the components) and determines the trajectory accordingly.

The trajectory generally refers to a manner by which the UAV may fly to visually access each of the components to inspect during the second phase inspection. The flight path determination tool 704 uses the pose information for the components to determine locations at which the UAV may visually access respective ones of the components. Visual access as used herein generally refers to the UAV navigating to a location about a structure at which a subject component may be positioned entirely within a field of view of a camera of the UAV. The visual access may be based on specific pose information for the subject component, for example, to ensure that a specific facet of the component is visible in which the location of that facet is known based on the pose information of the component.

To ensure inspection efficiency, however, recognizing that pose information may express visual access for a given component at multiple possible locations, determining the flight path includes determining a number of columns for the UAV to vertically navigate. The number of columns are determined to wholly or partially surround some or all of the structure. For example, the number of columns may be two or four. The particular number of columns to use for a given inspection may be dependent upon the location of the structure relative to obstructions or other structures in the scene, the type of the structure, and/or other factors. The use of columns for vertical navigation restricts horizontal traversal of the UAV proximate to the structure for the safety and security of the UAV and the structure.

The flight path determination tool 704 determines the number of columns according to the trajectory and thus the locations of the components and the pose information thereof. For example, flight path mapping software as is commonly used in UAV inspection systems may be used to determine an optimal trajectory according to the location and pose information of the components. The number of columns may thus be automatically determined based on the output of such flight path mapping functionality. In some cases, the number of columns may be determined based on user input processed using the user input processing tool 700. In either case, the locations of the columns are also determined according to the number of columns. For example, where two columns may be used to visually access all necessary components to inspect during the second phase inspection, the two columns may be located at opposing diagonal ends of the structure. In another example, where four columns may be used to visually access all such components, the four columns may form a rectangular boundary around the relevant part or whole of the structure and thus be located at corners of that rectangular boundary.

The flight path determination tool 704 then uses the number of columns and the trajectory to determine the flight path for the second phase inspection of the structure. In particular, the flight path generally corresponds to the trajectory but aligns with the locations of the columns to ensure that the UAV efficiently navigates between the columns. The flight path generally will cause the UAV to navigate between the columns at a certain altitude above the structure and then to descend to each of one or more capture point locations associated with the column to enable a capture of images of respective components visibly accessibly at the subject column. The flight path may generally begin at a first column and end at a last column. For example, navigating the flight path may include the UAV flying from an initial location to a location of the first column to begin the flight path.

The flight path determination tool 704 further determines camera poses for a camera of the UAV, to correspond with the capture points of the flight path. In particular, a camera pose represents a manner by which to orient a camera of the UAV in order to capture an image of a subject component at a subject capture point. The camera pose data may be embedded within the flight path using VPS, GPS, or another location-based system.

In some cases, an operator of the UAV, via a GUI output for display at the user device or a secondary device, may alter the flight path after it is determined. For example, the GUI may provide a graphical representation of the flight path about the scene of the structure and may include one or more user interface tools configured to enable a modification of some or all of the flight path. In one non-limiting example, a touch interface or click-and-drag approach may be used to alter one or more lines of the flight path.

In some cases, the flight path determination tool 704 may initiate the determination of the flight path using a template associated with the structure of a type of the structure. For example, the template may include capture points in a number of columns that are most commonly used for the specific structure under inspection or for structures of the same type as that specific structure. In some such cases, the operator of the UAV may modify some or all of the templatized flight path in the manner described above.

While the above describes the functionality of the flight path determination tool 704 with respect to all components determined by the structure component determination tool 702, in some cases, the flight path determination tool 704 determines a flight path for only a subset of those components. For example, the user input processed by the user input processing tool 700 may specify only certain types of components or only certain components to inspect. The flight path determination tool 704 may thus reference the components determined using the structure component determination tool 702 against the components represented within that user input to determine a subset of the components for which to determine the flight path. In some such cases, the subset of components for which to determine the flight path may also or instead be determined based on additional user input obtained using the user input processing tool 700 (e.g., after the first inspection phase of the multi-phase semantic 3D scan of the structure). In another example, an automated determination of a subset of the components determined using the component determination tool 702 may be made based on historical scan data for the structure or similar structures, information related to the structure or similar structures, and/or like factors.

The semantic 3D scan inspection tool 706 causes a performance of a multi-phase inspection of the structure, including a first phase inspection performed to determine a semantic understanding of the components and the pose information of the components and a second phase inspection performed according to the flight path to determine output associated with some or all of those components. In particular, to cause a performance of the first phase inspection, the semantic 3D scan inspection tool 706 causes a navigation system of the UAV (e.g., via the propulsion control interface 510 shown in FIG. 5) to fly the UAV so as to orbit around the scene that includes the structure. Orbiting around the scene may, for example, include the UAV circling the structure, navigating along a perimeter or like boundary of the structure, or otherwise exploring the scene of the structure from a distance. In some cases, the orbiting can follow a zig-zag, lawnmower, or other pattern around the scene of the structure. The orbiting may be performed at one or more altitudes relative to the structure.

To begin the first phase inspection, a location of the structure is provided via VPS, GPS, or a like location service. The semantic 3D scan inspection tool 706 instructs the navigation system of the UAV to navigate toward the location of the structure at an altitude above the structure while instructing one or more cameras of the UAV to capture images and/or video of the structure with the structure visible and centered within a field of view of the one or more cameras. The UAV accordingly navigates toward the structure with the entire structure visible and centered within the field of view of the one or more cameras until the structure is large enough to cover a threshold percentage (e.g., 50 percent) of the images or video captured by the one or more cameras (a threshold percentage of the pixels of the images or video frames). Based on a determination that the structure covers the threshold percentage of the images or video, the UAV begins its orbit around the structure while continuing to capture images or video (i.e., exploration images) until all portions of the structure have been captured within at least one image or video frame. Those images or video captured while the UAV orbits around the structure are then provided to the structure component determination tool 702 for use in determining the components of the structure and pose information of the components.

To cause a performance of the second phase inspection, the semantic 3D scan inspection tool 706 causes the navigation system of the UAV to fly the UAV according to the flight path determined using the flight path determination tool 704. When the UAV arrives at a given capture point of the flight path, the semantic 3D scan inspection tool 706 causes the UAV, via the one or more cameras of the UAV, to perform a fine-aiming process by which a camera of the UAV is aimed at a component of the structure according to a camera pose represented within or otherwise by the flight path. The semantic 3D scan inspection tool 706 determines whether the component is centered within a field of view of the camera (e.g., based on the component covering a threshold percentage (e.g., fifty percent) of the field of view). Based on a determination that the component is centered within the field of view of the camera, the semantic 3D scan inspection tool 706 causes the camera to capture an image of the component. The UAV then navigates to a next capture point of the flight path and continues to capture images of components and navigate along the flight path until a last capture point is reached and an image is captured thereat. At such a time, the UAV is determined to have completed the flight path and may return to its dock or to another location for further action.

The output of the second phase inspection includes the images of the components captured at the capture points of the flight path (i.e., inspection images). Those images are labeled with information associated with one or both of the structure or the flight path. For example, the images may be embedded with data or metadata identifying a location of the structure, a name or other identifier associated with the structure, a name or other identifier of respective components depicted within the images, columns of the flight path in which the UAV was located when the images were captured, a date of the inspection, and/or like information.

The multi-phase semantic 3D scan software 606 is shown and described as being run (e.g., executed, interpreted, or the like) at a UAV used to perform an inspection of a structure. However, in some cases, the multi-phase semantic 3D scan software 606 or one or more of the tools 700 through 706 may be run other than at the UAV. For example, one or more of the tools 700 through 706 may be run at a user device or a server device and the output thereof may be communicated to the UAV for processing.

In some implementations, trajectories other than columns may be used to determine the flight path and to navigate according to the flight path during the inspection phase. For example, the flight path, rather than being based on columns, may instead include an orbit trajectory such as a lawnmower pattern, zig-zag pattern, horizontal line pattern, oblique line pattern, or even random waypoints. The particular type of trajectory may be based on the structure type, and thus the use of columns or the non-use of columns may be based on the structure type. Implementations of this disclosure that address columns may thus be understood to also address alternative trajectories as set forth herein.

Figure 8:
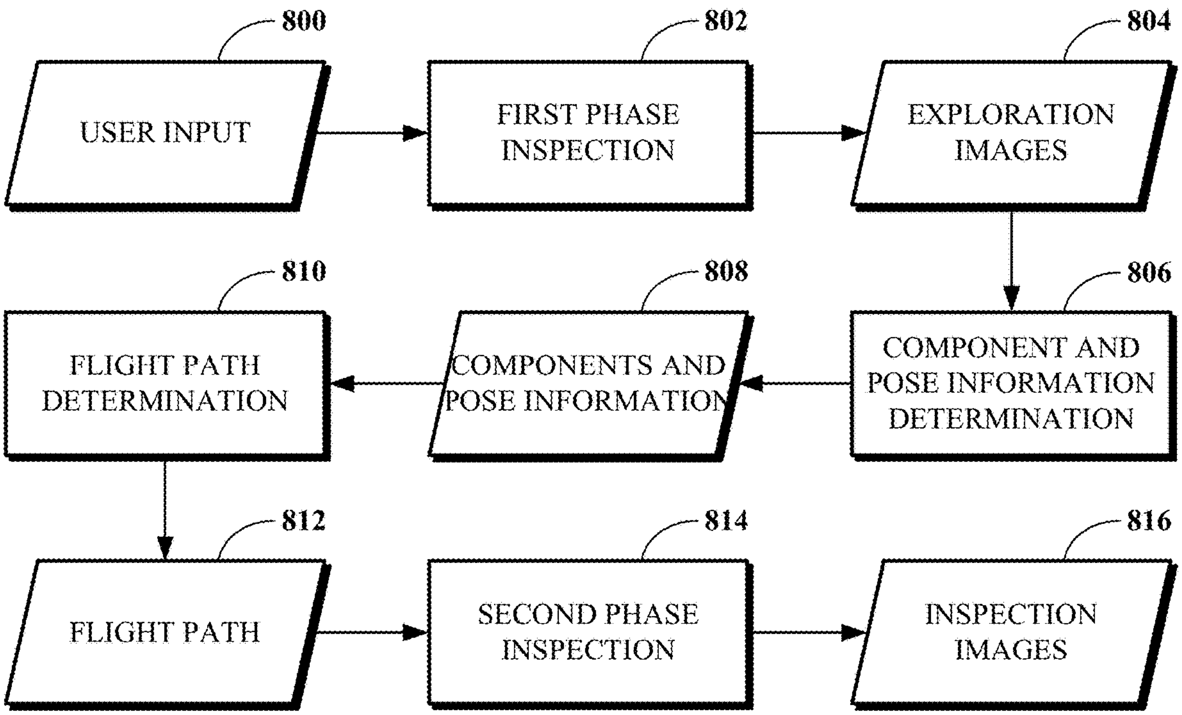
FIG. 8 is a block diagram of an example workflow for multi-phase semantic 3D scan.

FIG. 8 is a block diagram of an example workflow for multi-phase semantic 3D scan. The workflow generally describes operations performed for the multi-phase semantic 3D scan of a structure, such as using the multi-phase semantic 3D scan software 606 shown and described with respect to FIGS. 6 and 7, as well as inputs and outputs of those operations. First, user input 800 is obtained to identify the structure and provide configurations for the multi-phase inspection. A first phase inspection operation 802 is performed to capture exploration images 804 based on an orbiting of the UAV about the scene of the structure. The exploration images 804 are provided to a component and pose information determination operation 806 to determine components of the structure and pose information of the components 808. A flight path determination operation 810 uses the components and pose information 808 to determine a flight path 812. The flight path is then provided for use with a second phase inspection operation 814, the output of which is inspection images 816 of at least a subset of components of the structure.

Figure 9A:
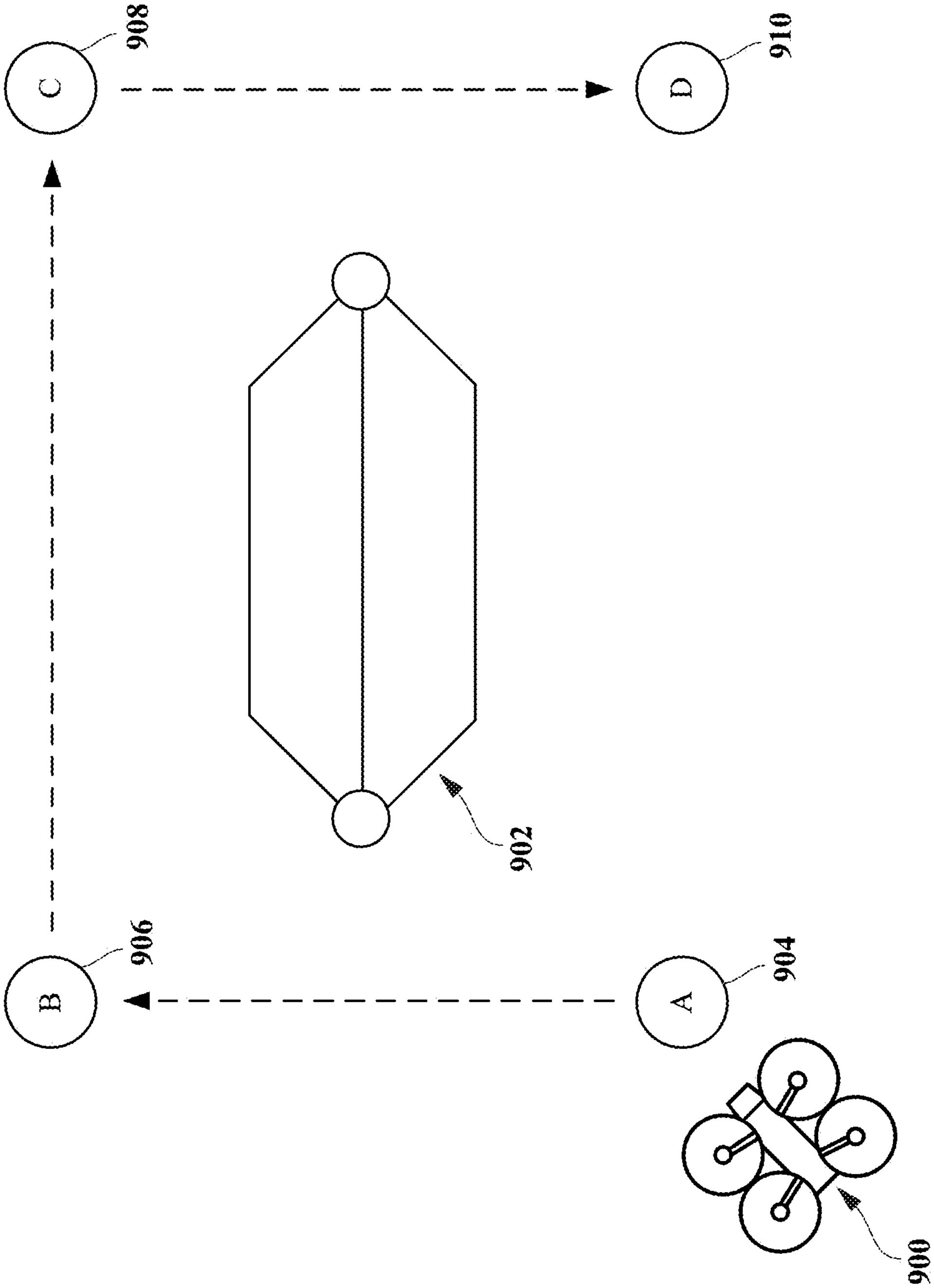
FIGS. 9A-B are illustrations of example columns of a flight path used during an inspection phase for semantic 3D scan.
Figure 9B:
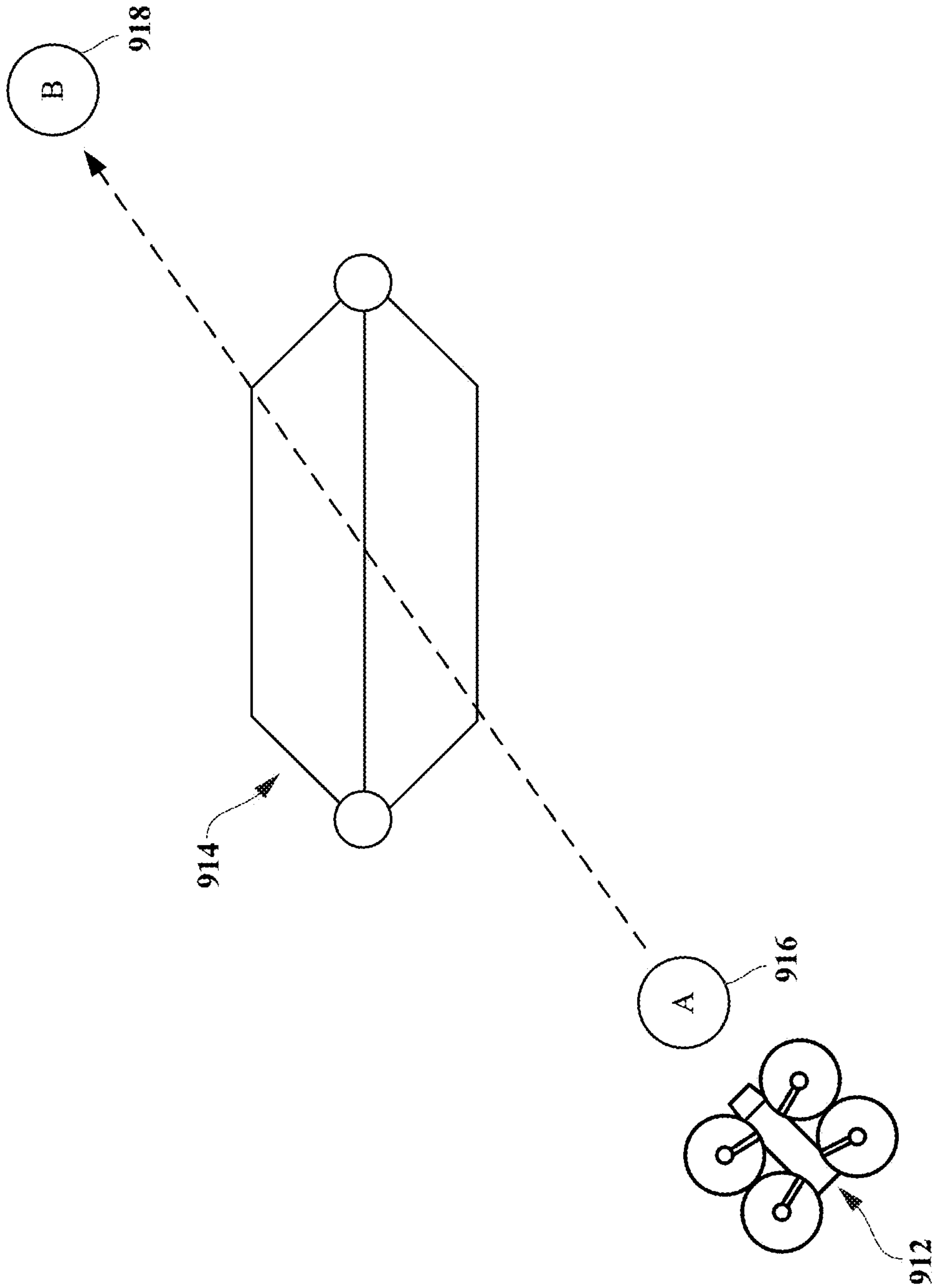

FIGS. 9A-B are illustrations of example columns of a flight path used during an inspection phase for semantic 3D scan, it being recognized that columns are merely one option of trajectory for a flight path in accordance with the implementations of this disclosure. Referring first to FIG. 9A, a UAV 900 approaches a structure 902 (e.g., a powerline transmission tower). The UAV 900 and the structure 902 may, for example, respectively be the UAV 602 and the structure 604 shown in FIG. 6. The UAV 900 is configured to navigate around the structure to perform an inspection of the structure according to a flight path including four columns 904, 906, 908, and 910, which generally are located at corners of a rectangular boundary around the structure 902. The UAV 900 first navigates at a first altitude to the column 904 and descends at the location of the column 904 to capture one or more images at one or more capture points associated with the column 904. The UAV 900, after descending to a final capture point associated with the column 904 and capturing one or more images at the final capture point, ascends to a navigation height and flies to the column 906. The UAV 900 then proceeds to descend to associated capture points and capture applicable images thereat before ascending to fly to the column 908 and eventually the column 910, in which the UAV 900 operates as described above to capture images at applicable capture points thereof. The UAV 900, after capturing a final image at a capture point of the column 910, is deemed to have completed the flight path and accordingly returns to a dock thereof or another location.

Referring next to FIG. 9B, a UAV 912 approaches a structure 914 (e.g., a powerline transmission tower). The UAV 912 and the structure 914 may, for example, respectively be the UAV 602 and the structure 604 shown in FIG. 6. The UAV 912 is configured to navigate around the structure to perform an inspection of the structure according to a flight path including two columns 916 and 918, which are generally located at opposing diagonal corners of a boundary of the structure 914. The UAV 912 first navigates at a first altitude to the column 916 and descends at the location of the column 916 to capture one or more images at one or more capture points associated with the column 916. The UAV 912, after descending to a final capture point associated with the column 916 and capturing one or more images at the final capture point, ascends to a navigation height and flies to the column 918. The UAV 912 again descends at the location of the column 918 to capture one or more images at each capture point associated with the column 918. The UAV 912, after capturing a final image at a capture point of the column 918, is deemed to have completed the flight path and accordingly returns to a dock thereof or another location.

Figure 10:
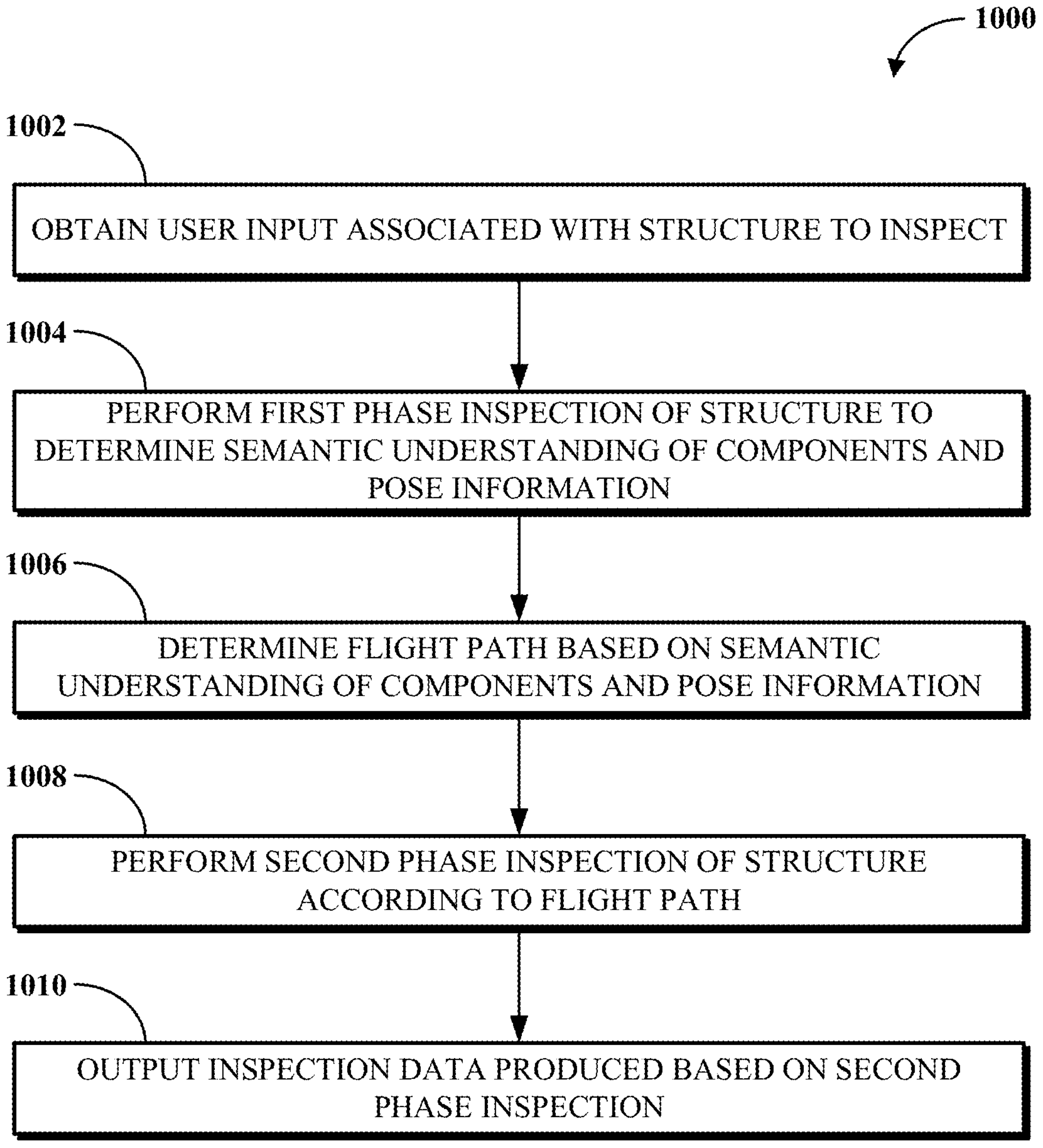
FIG. 10 is a flowchart of an example of a technique for multi-phase semantic 3D scan for structure inspection.

To further describe some implementations in greater detail, reference is next made to examples of techniques for semantic 3D scan for multi-phase structure inspection. FIG. 10 is a flowchart of an example of a technique 1000 for multi-phase semantic 3D scan for structure inspection. The technique 1000 can be executed using computing devices, such as the systems, hardware, and software described with respect to FIGS. 1-9B. The technique 1000 can be performed, for example, by executing a machine-readable program or other computer-executable instructions, such as routines, instructions, programs, or other code. The steps, or operations, of the technique 1000, or another technique, method, process, or algorithm described in connection with the implementations disclosed herein can be implemented directly in hardware, firmware, software executed by hardware, circuitry, or a combination thereof.

For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1002, user input associated with a structure to inspect is obtained. The user input corresponds to one or more configurations for the inspection of the structure. For example, the user input may correspond to one or more of an object of interest, a traversal height, a flight distance, a maximum speed, an exploration radius, a gimbal angle, or a column path, wherein the user input is used to perform the first phase inspection. The user input may, for example, be obtained from a user device in communication (e.g., wireless communication) with a UAV to use to perform the inspection.

At 1004, a first phase inspection of the structure is performed using the UAV to determine a semantic understanding of components of the structure and pose information of the components. Performing the first phase inspection of the structure includes navigating the UAV to a distance from the structure such that all of the structure is within a field of view of a camera of the UAV. Performing the first phase inspection of the structure further includes detecting the components using a camera of the unmanned aerial vehicle and storing data indicative of the detected components on two-dimensional images associated with associated poses of the camera. That is, once the structure is centered within the field of view of the camera of the UAV, and based on a determination that the structure covers a threshold percentage of the field of view, one or more images of the structure are captured using the camera. Thereafter, the components of the structure are detected within the one or more images, and data indicative of the detected components is stored for later use during the multi-phase inspection. For example, the components may be detected within the one or more images using a computer vision technique or multiple such techniques, such as one or more of object detection, object recognition, or image segmentation. Detecting the components may further, for example, include triangulating, using the UAV, locations of the components, such as to determine unique locations of the components in 3D space.

At 1006, a flight path is determined based on the components and the pose information. The flight path indicates capture points and camera poses associated with the capture points. For example, determining the flight path may include determining a number of columns for the unmanned aerial vehicle to vertically navigate, wherein each column of the number of columns includes one or more of the capture points. In non-limiting examples, the number of columns may be two or four.

At 1008, a second phase inspection of the structure is performed using the UAV according to the flight path. The second phase inspection may be performed for all components detected within the one or more images captured during the first phase inspection or for a subset of those components. Performing the second phase inspection may include navigating the UAV in a particular manner based on the number of columns of the flight path. For example, where the number of columns is four columns, the four columns form a rectangular boundary surrounding the structure, and performing the second phase inspection of the subset of the components according to the flight path may include navigating the UAV about the rectangular boundary including ascending to a traversal height while moving between ones of the four columns. In another example, where the number of columns is two, the two columns are at diagonally opposing locations about the structure, and performing the second phase inspection of the subset of the components according to the flight path may include navigating the UAV between the two columns over the structure. In either case, performing the second phase inspection according to the flight path includes, while the UAV is at a capture point of the capture points, aiming a camera of the UAV at a component of the components according to a camera pose of the camera poses, and capturing, using the aimed camera, an image of the component. For example, aiming the camera at the component according to the camera pose may include continuously attempting to detect the component within a video feed captured using the camera until the component is centered in images of the video feed.

At 1010, inspection data produced based on the second phase inspection is output. The inspection data may, for example, include one or more images captured during the second phase inspection. In some cases, the one or more images of the inspection data may be labeled with information associated with one or both of the structure or the flight path. For example, labeling the one or more images of the inspection data may include introducing metadata (e.g., EXIF metadata) on files of the one or more images. Alternatively, labeling the one or more images of the inspection data may include moving files of the one or more images into folders of a storage system (e.g., at the UAV, user device, or server), such that the labeling corresponds to the corresponding images being labeled according to a name of their respective folders.

In some implementations, the exploration phase and inspection phase may be collectively referred to as a first inspection, and a second inspection using the UAV may be performed or at least initiated while the first inspection remains in progress. For example, an exploration phase of a second inspection may be interleaved with the inspection phase of the first inspection. In such a case, the exploration of next structure components may be performed at the same time as the inspection of the current structure components.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices.

Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

causing a navigation system of an unmanned aerial vehicle, to fly the unmanned aerial vehicle around a scene that includes a structure to perform a first phase inspection of the structure;

determining, based on the first phase inspection, a semantic understanding of components associated with the structure and pose information of the components;

determining, based on the semantic understanding of the components and the pose information, a flight path indicating capture points and camera poses associated with the capture points; and causing the navigation system to fly the unmanned aerial vehicle, around the scene according to the flight path to perform a second phase inspection of a subset of the components.

2. The method of claim 1, wherein causing the navigation system of the unmanned aerial vehicle to fly the unmanned aerial vehicle around the scene that includes the structure to perform the first phase inspection of the structure comprises:

navigating the unmanned aerial vehicle to a distance from the structure such that all of the structure is within a field of view of a camera of the unmanned aerial vehicle.

3. The method of claim 1, wherein causing the navigation system of the unmanned aerial vehicle to fly the unmanned aerial vehicle around the scene that includes the structure to perform the first phase inspection of the structure comprises:

detecting the components using a camera of the unmanned aerial vehicle; and storing data indicative of the detected components on two-dimensional images associated with associated poses of the camera.

4. The method of claim 3, wherein detecting the components comprises:

triangulating, using the unmanned aerial vehicle, locations of the components.

5. The method of claim 1, wherein determining the flight path indicating the capture points and the camera poses comprises:

determining a number of columns for the unmanned aerial vehicle to vertically navigate, wherein each column of the number of columns includes one or more of the capture points.

6. The method of claim 5, wherein the number of columns is four columns, the four columns form a rectangular boundary surrounding the structure, and causing the navigation system to fly the unmanned aerial vehicle around the scene according to the flight path to perform the second phase inspection of the subset of the components comprises:

navigating the unmanned aerial vehicle about the rectangular boundary including ascending to a traversal height while moving between ones of the four columns.

7. The method of claim 5, wherein the number of columns is two columns, the two columns are at diagonally opposing locations about the structure, and causing the navigation system to fly the unmanned aerial vehicle around the scene according to the flight path to perform the second phase inspection of the subset of the components comprises:

navigating the unmanned aerial vehicle between the two columns over the structure.

8. The method of claim 1, wherein causing the navigation system to fly the unmanned aerial vehicle around the scene according to the flight path to perform the second phase inspection of the subset of the components comprises:

while the unmanned aerial vehicle is at a capture point of the capture points, aiming a camera of the unmanned aerial vehicle at a component of the components according to a camera pose of the camera poses; and capturing, using the aimed camera, an image of the component.

9. The method of claim 8, wherein aiming the camera at the component according to the camera pose comprises:

continuously attempting to detect the component within a video feed captured using the camera until the component is centered in images of the video feed.

10. The method of claim 8, comprising:

labeling the image with information associated with one or both of the structure or the flight path.

11. The method of claim 1, comprising:

obtaining user input corresponding to one or more of an object of interest, a traversal height, a flight distance, a maximum speed, an exploration radius, a gimbal angle, or a column path, wherein the user input is used to perform the first phase inspection.

12. An unmanned aerial vehicle, comprising:

a navigation system;

one or more cameras;

one or more memories; and one or more processors configured to execute instructions stored in the one or more memories to:

fly, using the navigation system, the unmanned aerial vehicle around a scene that includes a structure to perform a first phase inspection of the structure, wherein, based on one or more images captured using the one or more cameras during the first phase inspection, a semantic understanding of components associated with the structure and pose information of the components is determined; and fly, using the navigation system, the unmanned aerial vehicle around the scene according to a flight path that is based on the semantic understanding of the components and the pose information to perform a second phase inspection of a subset of the components.

13. The unmanned aerial vehicle of claim 12, wherein, to fly the unmanned aerial vehicle around the scene that includes the structure to perform the first phase inspection of the structure, the one or more processors are configured to execute the instructions to:

capture the one or more images while all of the structure remains within a field of view of the one or more cameras; and perform image segmentation to detect the components within the one or more images.

14. The unmanned aerial vehicle of claim 13, wherein, to detect the components within the one or more images, the one or more processors are configured to execute the instructions to:

triangulate locations of the components to determine unique locations in three-dimensional space of the components.

15. The unmanned aerial vehicle of claim 12, wherein, to fly the unmanned aerial vehicle around the scene according to the flight path to perform the second phase inspection of the subset of the components, the one or more processors are configured to execute the instructions to:

aim the one or more cameras at a component; and capture, using the aimed one or more cameras, an image of the component.

16. The unmanned aerial vehicle of claim 12, wherein the one or more processors are configured to execute the instructions to:

determine the flight path based on the semantic understanding of the components and the pose information, wherein the flight path indicates capture points and camera poses associated with the capture points, and wherein the capture points are arranged into a number of columns for the unmanned aerial vehicle to vertically navigate.

17. A system, comprising:

an unmanned aerial vehicle; and a user device in communication with the unmanned aerial vehicle, wherein the unmanned aerial vehicle is configured to:

fly, using a navigation system of the unmanned aerial vehicle, around a scene that includes a structure to perform a first phase inspection of the structure according to user input obtained from the user device, wherein a semantic understanding of components associated with the structure and pose information of the components is determined based on the first phase inspection;

determine, based on the semantic understanding of the components and the pose information, a flight path indicating a number of columns for the unmanned aerial vehicle to vertically navigate, wherein each column of the number of columns includes one or more capture points each associated with one or more of the components; and fly, using the navigation system, the unmanned aerial vehicle around the scene according to the flight path to perform a second phase inspection.

18. The system of claim 17, wherein the first phase inspection is performed while all of the structure is within a field of view of a camera of the unmanned aerial vehicle and the components are determined based on images captured using the camera.

19. The system of claim 18, wherein the camera is aimed at a component of the one or more of the components according to a camera pose associated with a respective capture point of the one or more capture points to capture an image of the component during the second phase inspection.

20. The system of claim 17, wherein, where the number of columns is four columns, the four columns form a rectangular boundary surrounding the structure and the unmanned aerial vehicle navigates about the rectangular boundary including ascending to a traversal height while moving between ones of the four columns, and wherein, where the number of columns is two columns, the two columns are at diagonally opposing locations about the structure and the unmanned aerial vehicle navigates between the two columns over the structure.

* * * * *